US011932019B2

(12) United States Patent
Sato et al.

(10) Patent No.: US 11,932,019 B2
(45) Date of Patent: Mar. 19, 2024

(54) WIPING MODULE, DISCHARGE MODULE, LIQUID DISCHARGE APPARATUS, AND WIPING METHOD OF WIPING MODULE

(71) Applicant: Seiko Epson Corporation, Tokyo (JP)

(72) Inventors: Seiya Sato, Matsumoto (JP); Eiji Miyashita, Tomi (JP); Masaki Shimomura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 32 days.

(21) Appl. No.: 17/653,731

(22) Filed: Mar. 7, 2022

(65) Prior Publication Data

US 2022/0288936 A1 Sep. 15, 2022

(30) Foreign Application Priority Data

Mar. 10, 2021 (JP) ................................ 2021-038090

(51) Int. Cl.
*B41J 2/165* (2006.01)

(52) U.S. Cl.
CPC ....... *B41J 2/16535* (2013.01); *B41J 2/16517* (2013.01); *B41J 2/16538* (2013.01); *B41J 2/16541* (2013.01)

(58) Field of Classification Search
CPC B41J 2/16535; B41J 2/16517; B41J 2/16538; B41J 2/16541; B41J 2/16544
See application file for complete search history.

(56) References Cited

U.S. PATENT DOCUMENTS

2010/0177142 A1* 7/2010 Heo .................... B41J 2/16538 347/33

FOREIGN PATENT DOCUMENTS

JP 2011-056889 3/2011
JP 2016175289 A * 10/2016

* cited by examiner

*Primary Examiner* — Sharon Polk
(74) *Attorney, Agent, or Firm* — WORKMAN NYDEGGER

(57) ABSTRACT

A wiping module includes a wiping portion and a cleaning portion. The wiping portion includes a wiping member wiping a liquid discharge head that discharges a liquid from a nozzle provided on a nozzle surface, a storage support portion supporting the wiping member and configured to store the liquid by the wiping, and a movement support portion mounting the storage support portion and configured to reciprocate along a wiping direction, which is a direction in which the wiping is performed. The cleaning portion cleans the wiping member. The cleaning portion includes a cleaning member and a guide portion guiding the cleaning member. The cleaning member is configured to follow a movement of the wiping portion in the wiping direction and to scrape off the liquid adhering to the wiping member while being guided by the guide portion.

16 Claims, 14 Drawing Sheets

WIPING MODULE, DISCHARGE MODULE, LIQUID DISCHARGE APPARATUS, AND WIPING METHOD OF WIPING MODULE

The present application is based on, and claims priority from JP Application Serial Number 2021-038090, filed Mar. 10, 2021, the disclosure of which is hereby incorporated by reference herein in its entirety.

BACKGROUND

1. Technical Field

The present disclosure relates to a wiping module, a discharge module, a liquid discharge apparatus, and a wiping method of the wiping module.

2. Related Art

An ink jet type printer has been known in the related art. For the ink jet type printers, a printer having a cleaning mechanism that cleans a nozzle surface of a head is provided. For example, the cleaning mechanism of JP-A-2011-56889 includes a head wiper and a rotary wiper cleaner. The head wiper slides against the nozzle surface while moving forward to wipe off deposits adhering to the nozzle surface. The wiper cleaner rotates about a predetermined axis of rotation while sliding against a surface of the head wiper by being pushed by the head wiper moving forward after the head wiper has passed forward through the nozzle surface to scrape off deposits adhering to the surface of the head wiper. The deposits are, for example, ink or paper dust.

In the cleaning mechanism of JP-A-2011-56889, the wiper cleaner comes into contact with the head wiper that moves linearly while rotating the wiper cleaner. Therefore, it is apprehended that a contact state between the head wiper and the wiper cleaner is changed at the start and end of cleaning the head wiper. Because of this, it may be difficult to uniformly wipe the head wiper.

SUMMARY

According to an aspect of the present disclosure, a wiping module includes a wiping portion including a wiping member wiping a liquid discharge head that discharges a liquid from a nozzle provided on a nozzle surface, a storage support portion supporting the wiping member and configured to store the liquid by the wiping, and a movement support portion mounting the storage support portion and configured to reciprocate along a wiping direction, which is a direction in which the wiping is performed, and a cleaning portion cleaning the wiping member. The cleaning portion includes a cleaning member and a guide portion guiding the cleaning member. The cleaning member is configured to follow a movement of the wiping portion in the wiping direction and to scrape off the liquid adhering to the wiping member while being guided by the guide portion.

According to another aspect of the present disclosure, a discharge module includes a liquid discharge head discharging a liquid and the wiping module.

According to still another aspect of the present disclosure, a liquid discharge apparatus includes a liquid discharge head discharging a liquid, the wiping module, a coupling portion configured to be coupled to the storage support portion, and a decompression mechanism configured to reduce a pressure of the coupling portion.

According to still another aspect of the present disclosure, a wiping method is a wiping method of a wiping module which includes a wiping portion including a wiping member wiping a liquid discharge head that discharges a liquid from a nozzle provided on a nozzle surface, a storage support portion supporting the wiping member and configured to store the liquid by the wiping, and a movement support portion mounting the storage support portion and configured to reciprocate along a wiping direction, which is a direction in which the wiping is performed, and a cleaning portion cleaning the wiping member, in which the cleaning portion includes a cleaning member and a guide portion guiding the cleaning member, the method including: causing the cleaning member to follow a movement of the wiping portion in the wiping direction which is a direction in which the wiping is performed, and scrape off the liquid adhering to the wiping member while being guided by the guide portion.

DESCRIPTION OF EXEMPLARY EMBODIMENTS

Hereinafter, an embodiment of a specified liquid discharge apparatus will be described. The liquid discharge apparatus is an ink jet type printer that performs printing by discharging, for example, a printing liquid, which is a liquid for printing, to a medium to be printed. The medium is, for example, paper or cloth. The printing liquid is, for example, ink.

Liquid Discharge Apparatus

Figure 1:
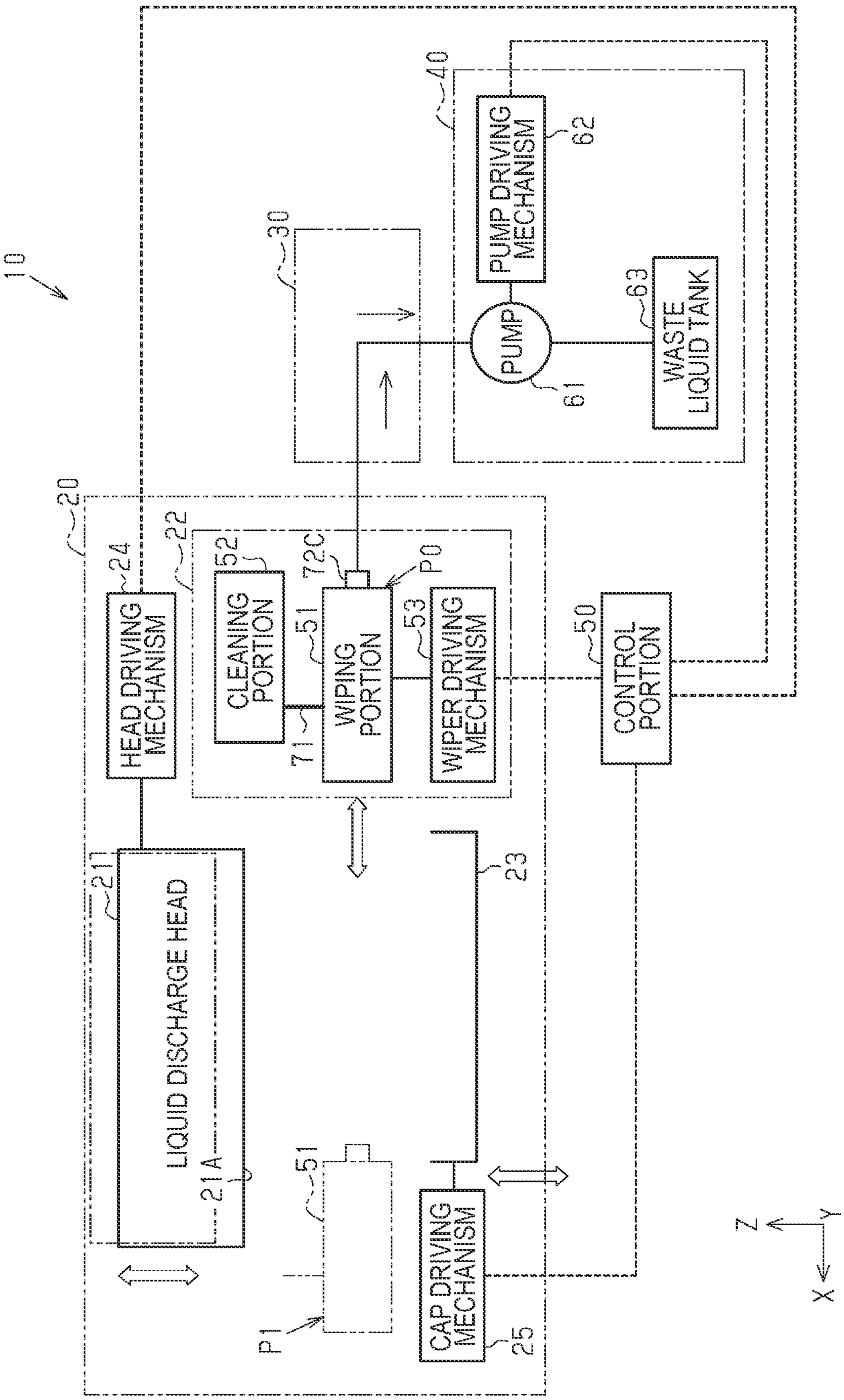
FIG. 1 is a block diagram illustrating a schematic configuration of a liquid discharge apparatus according to an embodiment.

As illustrated in FIG. 1, a liquid discharge apparatus 10 includes a discharge module 20, a coupling portion 30, a decompression mechanism 40, and a control portion 50. These configurations are provided inside a housing (not illustrated).

The discharge module 20 includes a liquid discharge head 21, a wiping module 22, a head cap 23, a head driving mechanism 24, and a cap driving mechanism 25.

The liquid discharge head 21 discharges a printing liquid. The liquid discharge head 21 is, for example, a line type head extending in a direction along an X axis in a Cartesian coordinate system including XYZ axes. The liquid discharge head 21 discharges the printing liquid to a medium from a plurality of nozzles provided on a nozzle surface 21A thereof to form an image on a surface of the medium. The image includes characters, figures, and the like. Moreover, the medium is transported in a direction along a Y axis by a transport mechanism (not illustrated).

The liquid discharge head 21 can move in a direction along a Z axis through the driving of the head driving mechanism 24. The liquid discharge head 21 moves between a set position and a retracted position. The set position is a position when printing is performed on the medium. The retracted position is a position shifted upward along the Z axis with respect to the set position, and is a position when the nozzle surface 21A of the liquid discharge head 21 is cleaned.

The head cap 23 moves between a closed position and the retracted position through the driving of the cap driving mechanism 25. The closed position is a position where the nozzle surface 21A of the liquid discharge head 21 is covered. The retracted position is a position where the nozzle surface 21A of the liquid discharge head 21 is opened, and is a position where the discharge of the printing liquid is not disturbed. When the printing is not performed, the head cap 23 is held in the closed position. As a result, the nozzle of the liquid discharge head 21 is prevented from drying out. When the printing is performed, the head cap 23 moves from the closed position to the retracted position.

The wiping module 22 is a wiper unit. The wiping module 22 wipes the nozzle surface 21A of the liquid discharge head 21. The wiping module 22 has a wiping portion 51, a cleaning portion 52, and a wiper driving mechanism 53.

The wiping portion 51 can reciprocate in the direction along the X axis through the driving of the wiper driving mechanism 53. The wiping portion 51 moves between a wiper home position P0 indicated by a solid line in FIG. 1 and a wiper start position P1 indicated by an alternate long and two short dashes line in FIG. 1. The wiper home position P0 is, for example, a reference position when power is supplied. The wiper home position P0 is a position outside a first end of the liquid discharge head 21 along the X axis. The wiper start position P1 is a position where wiping of the nozzle surface 21A is started. The wiper start position P1 is a position outside a second end of the liquid discharge head 21 along the X axis. Moreover, the wiping portion 51 can also move in a direction opposite to the wiper start position P1 along the X axis based on the wiper home position P0.

The wiping portion 51 has a wiping member 71 and a discharge portion 72C. The wiping member 71 is slidable against the nozzle surface 21A as the wiping portion 51 moves. The wiping member 71 is a wiper. The wiping member 71 slides against the nozzle surface 21A to wipe the printing liquid adhering to the nozzle surface 21A. The printing liquid wiped with the wiping member 71 is stored by the wiping portion 51. The printing liquid stored by the wiping portion 51 can be discharged to the outside via the discharge portion 72C.

The cleaning portion 52 is a cleaner unit. The cleaning portion 52 cleans the printing liquid adhering to the wiping member 71 of the wiping portion 51. The cleaning portion 52 can integrally move outside a wiping area as the wiping portion 51 moves. The cleaning portion 52 cleans the wiping member 71 with the movement of the wiping portion 51.

The coupling portion 30 can be coupled between the wiping portion 51 and the decompression mechanism 40. When the wiping portion 51 is located at the wiper home position P0, the discharge portion 72C of the wiping portion 51 is coupled to the decompression mechanism 40 via the coupling portion 30.

The decompression mechanism 40 can reduce a pressure of the coupling portion 30. The decompression mechanism 40 includes a pump 61, a pump driving mechanism 62, and a waste liquid tank 63. The pump driving mechanism 62 is driven, for example, in a state where the wiping portion 51 is located at the wiper home position P0. By driving the pump 61 through the pump driving mechanism 62, the printing liquid stored by the wiping portion 51 is sucked via the discharge portion 72C and the coupling portion 30. The sucked printing liquid is discharged to the waste liquid tank 63 as a waste liquid.

The control portion 50 controls operations of the head driving mechanism 24, the cap driving mechanism 25, the wiper driving mechanism 53, and the pump driving mechanism 62.

Liquid Discharge Head

Figure 2:
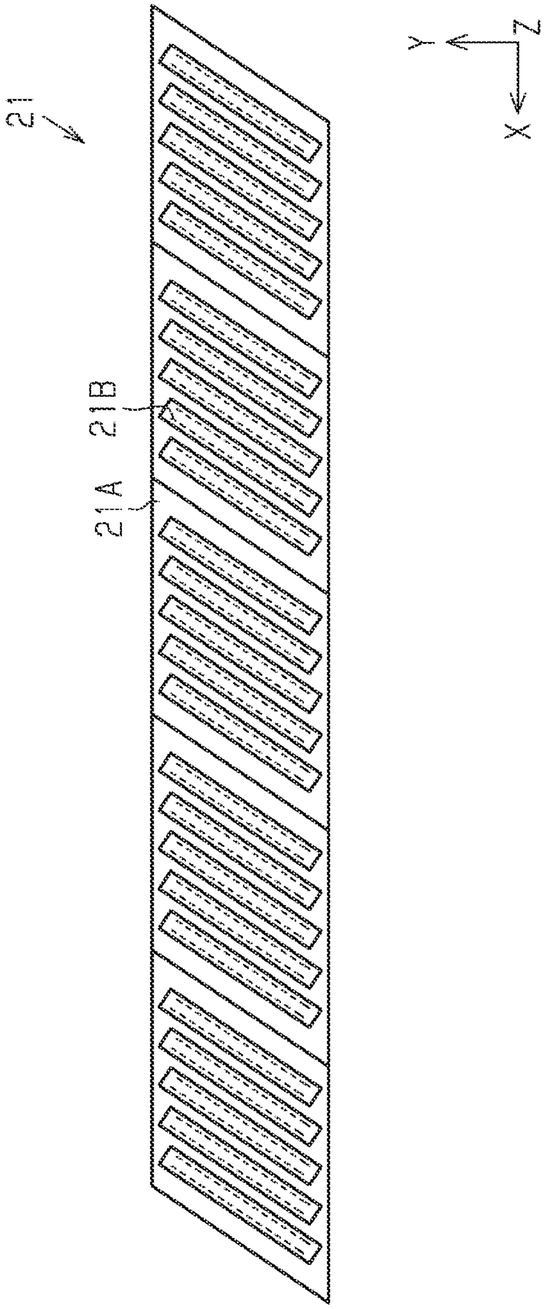
FIG. 2 is a bottom view of a liquid discharge head according to an embodiment.

As illustrated in FIG. 2, the liquid discharge head 21 is supported inside the housing via a support member. The liquid discharge head 21 includes a plurality of head units coupled in the direction along the X axis. A plurality of nozzles 21B are provided on the nozzle surface 21A of the liquid discharge head 21 when viewed from the direction along the Z axis. The nozzles 21B are arranged in a plurality of linear rows. The plurality of nozzle rows are arranged in the direction along the X axis. Further, the nozzle row extends in a direction intersecting an acute angle with respect to the direction along the X axis.

Wiping Portion

Next, the wiping portion 51 will be described in detail.

Figure 3:
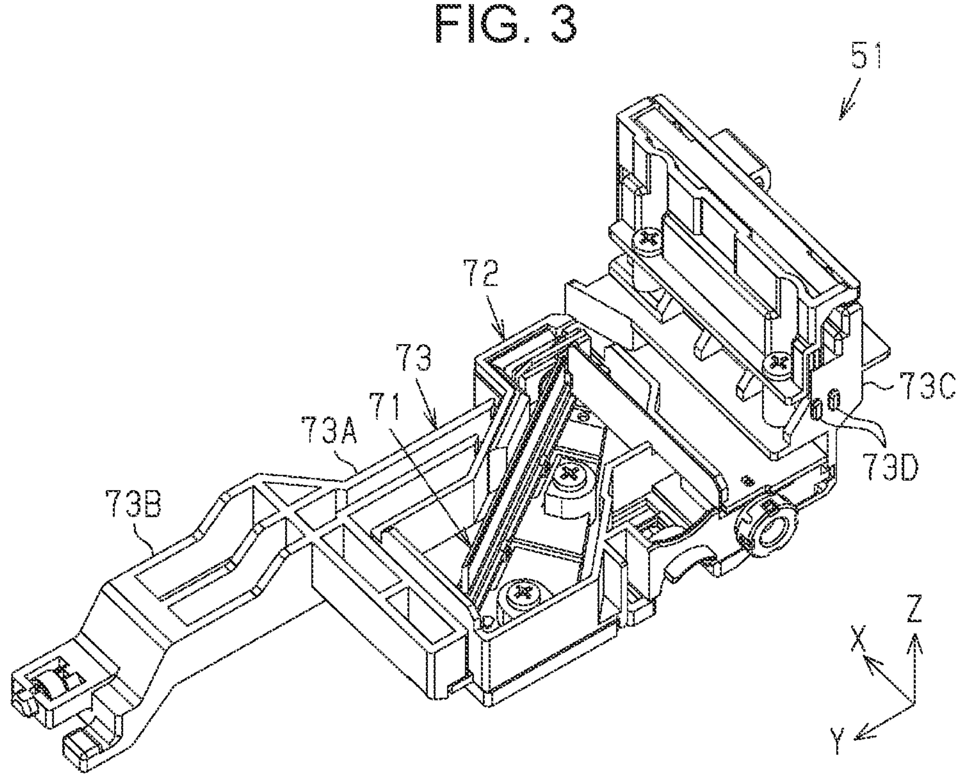
FIG. 3 is a perspective view of a wiping portion according to an embodiment.

As illustrated in FIG. 3, the wiping portion 51 has the wiping member 71, a storage support portion 72, and a movement support portion 73.

The movement support portion 73 supports the storage support portion 72. The movement support portion 73 has a mounting portion 73A, an arm portion 73B, and an abutting portion 73C. The mounting portion 73A has a rectangular box shape with one surface in the direction along the Z axis and two open surfaces in the direction along the X axis. The mounting portion 73A has three side walls. A first side wall and a second side wall face each other in the direction along the Y axis. The third side wall extends in the direction along the Y axis and couples the first side wall and the second side wall to each other. The storage support portion 72 is mounted inside the mounting portion 73A. The arm portion 73B is provided on an outer surface of the first side wall of the mounting portion 73A. The arm portion 73B extends along the Y axis in a direction opposite to the second side wall. The abutting portion 73C is provided on an upper part of the second side wall of the mounting portion 73A in the direction along the Y axis. The abutting portion 73C has a rectangular parallelepiped shape in general. A plurality of protrusions 73D are provided on one side surface of the abutting portion 73C in the direction along the X axis.

Figure 4:
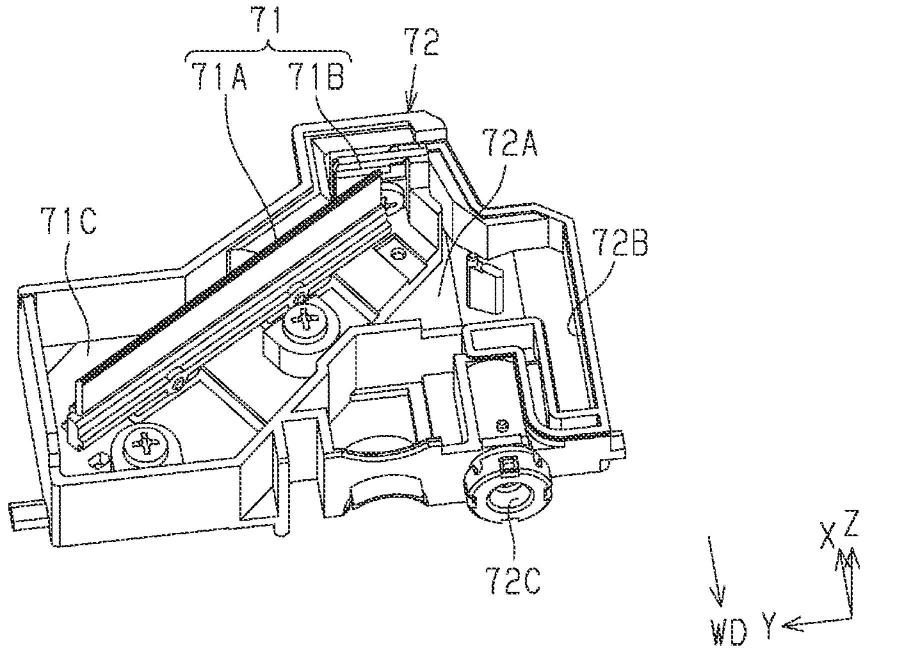
FIG. 4 is a perspective view of a storage support portion according to an embodiment.

As illustrated in FIG. 4, the storage support portion 72 supports the wiping member 71. The storage support portion 72 has a rectangular box shape with an open surface in the direction along the Z axis. The storage support portion 72 includes a storage portion 72A, a communication path 72B, and a discharge portion 72C. The storage portion 72A, the communication path 72B, and the discharge portion 72C are provided by partitioning the inside of the storage support portion 72 by a wall. The storage portion 72A, the communication path 72B, and the discharge portion 72C communicate with each other.

The communication path 72B is provided at a position closer to one side of the storage support portion 72 in the direction along the Y axis. The communication path 72B is a flow path that communicates between the storage portion 72A and the discharge portion 72C. The communication path 72B meanders in a reciprocating manner in the direction along the X axis. The direction along the X axis is a direction in which the wiping portion 51 moves. That is, the communication path 72B has a portion in which a waste liquid in the storage portion 72A flows in a direction opposite to a wiping direction WD. Moreover, the wiping direction WD means a direction in which the wiping portion 51 moves from the wiper start position P1 to the wiper home position P0 along the X axis.

The discharge portion 72C is provided on the side wall of the storage support portion 72. The discharge portion 72C is open to the side wall on a side where the wiping portion 51 moves from the wiper start position P1 to the wiper home position P0 along the X axis. The discharge portion 72C is provided on a lowermost portion of the storage portion 72A, that is, at a position higher than an inner bottom surface of the storage portion 72A.

The wiping member 71 is provided inside the storage support portion 72. The wiping member 71 includes a nozzle surface wiping member 71A and a side surface wiping member 71B. The nozzle surface wiping member 71A and the side surface wiping member 71B are made of rubber and have a rectangular plate shape. The nozzle surface wiping member 71A and the side surface wiping member 71B are detachable inside the storage portion 72A via a wiper base 71C. A contour shape of an outer circumference of the wiper base 71C corresponds to a contour shape of an inner circumference of the storage portion 72A. The wiper base 71C is provided so as to cover most of the inner bottom surface of the storage portion 72A.

The nozzle surface wiping member 71A is a main wiper. The nozzle surface wiping member 71A is for wiping the nozzle surface 21A. The nozzle surface wiping member 71A has a rectangular plate shape. The nozzle surface wiping member 71A is supported on the inner bottom surface of the storage portion 72A with two short sides in a posture along the Z axis. The nozzle surface wiping member 71A extends in a direction intersecting with the direction along the X axis. When viewed from the direction along the Z axis, an inclination direction and a degree of inclination for the direction of the nozzle surface wiping member 71A along the X axis are the same as those for the direction of the nozzle row along the X axis.

The side surface wiping member 71B is a sub-wiper. The side surface wiping member 71B is for wiping the side surface of the liquid discharge head 21 that intersects the nozzle surface 21A. The side surface wiping member 71B has a rectangular plate shape. The side surface wiping member 71B has a length shorter than that of the nozzle surface wiping member 71A. The side surface wiping member 71B is supported on the inner bottom surface of the storage portion 72A with two short sides in a posture along the Z axis. A long side of the side surface wiping member 71B extends in the direction along the Y axis. The side surface wiping member 71B is provided in the vicinity of the end of the nozzle surface wiping member 71A on a side close to the communication path 72B. The side surface wiping member 71B is located behind the nozzle surface wiping member 71A in a direction opposite to the wiping direction WD with respect to the end of the nozzle surface wiping member 71A on the side close to the communication path 72B. The side surface wiping member 71B follows the nozzle surface wiping member 71A when the wiping portion 51 moves from the wiper start position P1 to the wiper home position P0 along the X axis. The side surface wiping member 71B can capture the printing liquid removed from the nozzle surface wiping member 71A.

Wiper Driving Mechanism

Next, the wiper driving mechanism 53 will be described in detail.

Figure 5:
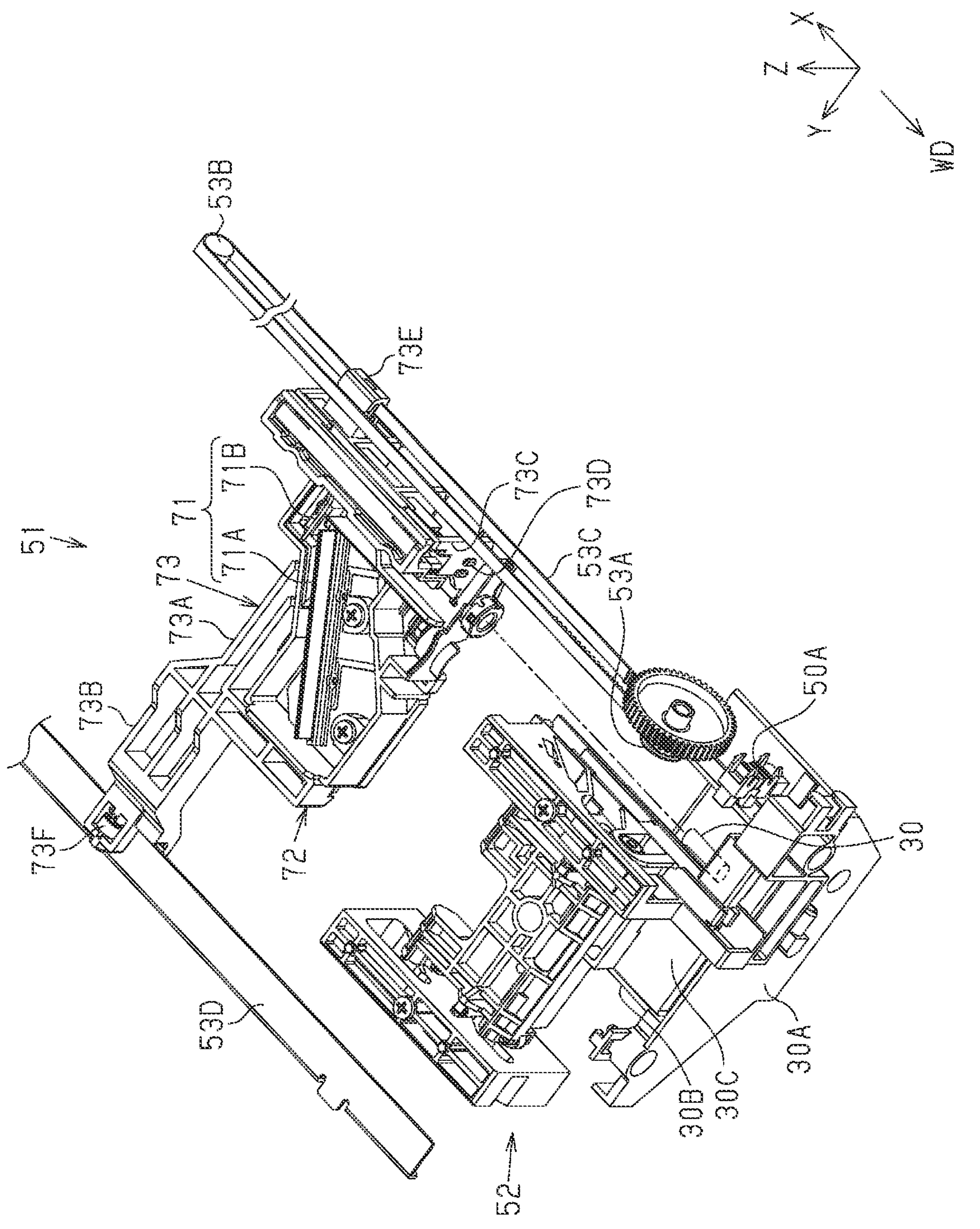
FIG. 5 is a perspective view of the wiping portion and a cleaning portion according to an embodiment.

As illustrated in FIG. 5, the wiper driving mechanism 53 includes a belt transmission mechanism including a drive pulley 53A, a driven pulley 53B, and an endless timing belt 53C. The drive pulley 53A and the driven pulley 53B are rotatably supported by a support portion provided inside the housing. The drive pulley 53A and the driven pulley 53B are separated from each other in the direction along the X axis. The separation distance between the drive pulley 53A and the driven pulley 53B is set to be longer than a moving distance between the wiper home position P0 and the wiper start position P1 of the wiping portion 51. The timing belt 53C is wound around the drive pulley 53A and the driven pulley 53B. The timing belt 53C circularly travels by rotating the drive pulley 53A and the driven pulley 53B. Moreover, the drive pulley 53A rotates through an operation of a drive source such as a motor (not illustrated).

The wiper driving mechanism 53 has a guide rail 53D. The guide rail 53D has a flat plate shape extending in the direction along the X axis. A length of the guide rail 53D in the direction along the X axis is set to be longer than the moving distance between the wiper home position P0 and the wiper start position P1 of the wiping portion 51. The guide rail 53D is fixed to the inside of the housing. The guide rail 53D and the belt transmission mechanism are separated from each other in the direction along the Y axis.

The movement support portion 73 is disposed between the guide rail 53D and the belt transmission mechanism. The arm portion 73B of the movement support portion 73 is supported by the guide rail 53D via the guide roller 73F. The arm portion 73B is guided by the guide rail 53D via the guide roller 73F. The abutting portion 73C is coupled to a portion of the timing belt 53C located on a lower side along the Z axis via a coupling member 73E. As the timing belt 53C travels, the movement support portion 73 moves in the direction along the X axis while being guided by the guide rail 53D.

Cleaning Portion

Next, the cleaning portion 52 will be described in detail.

Figure 6:
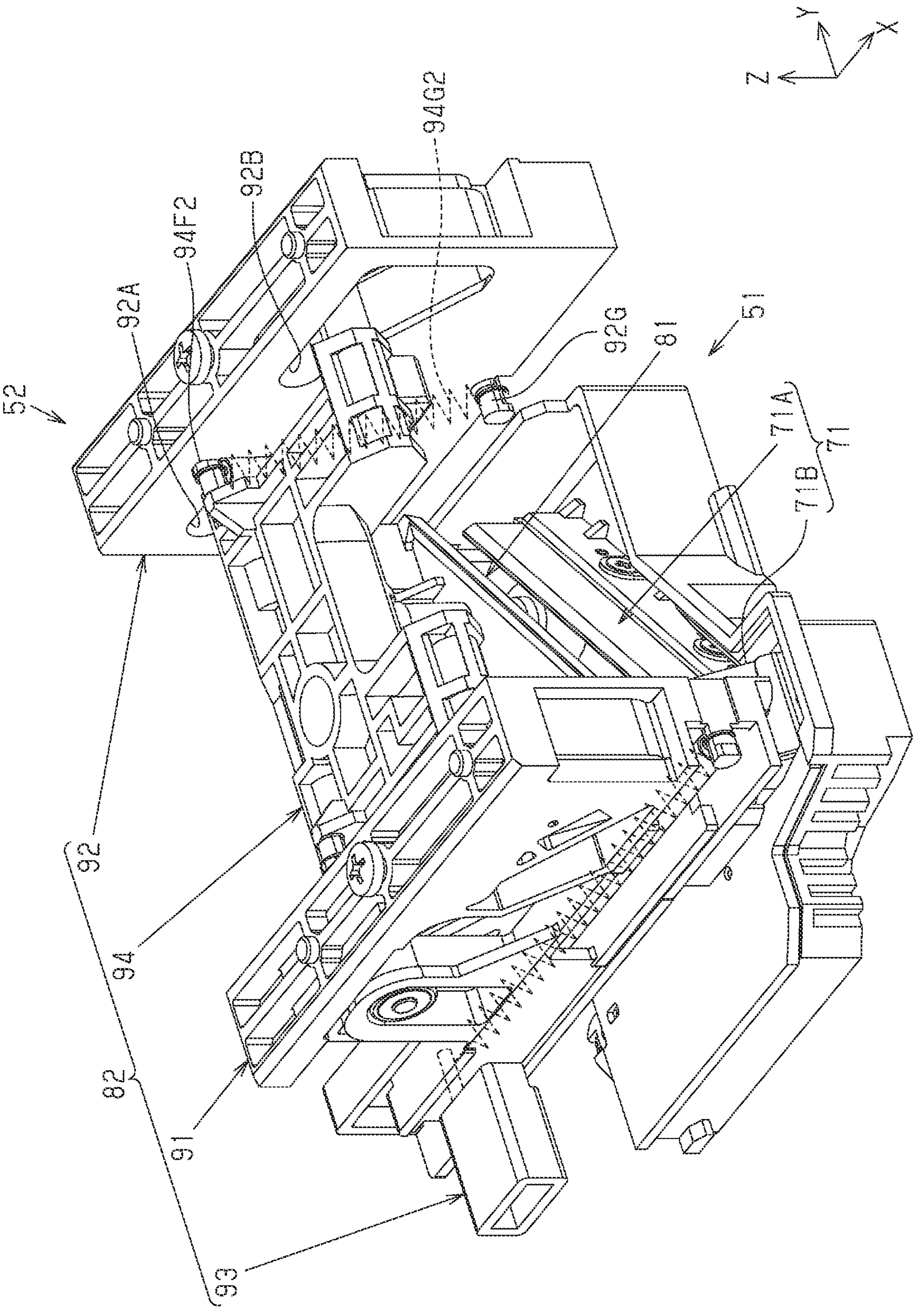
FIG. 6 is a perspective view of the wiping portion and the cleaning portion according to an embodiment.

As illustrated in FIG. 6, the cleaning portion 52 is located above the wiping portion 51 located at the wiper home position P0, for example, along the Z axis. However, the movement support portion 73 is omitted in FIG. 6. The cleaning portion 52 is for cleaning the wiping member 71.

Figure 7:
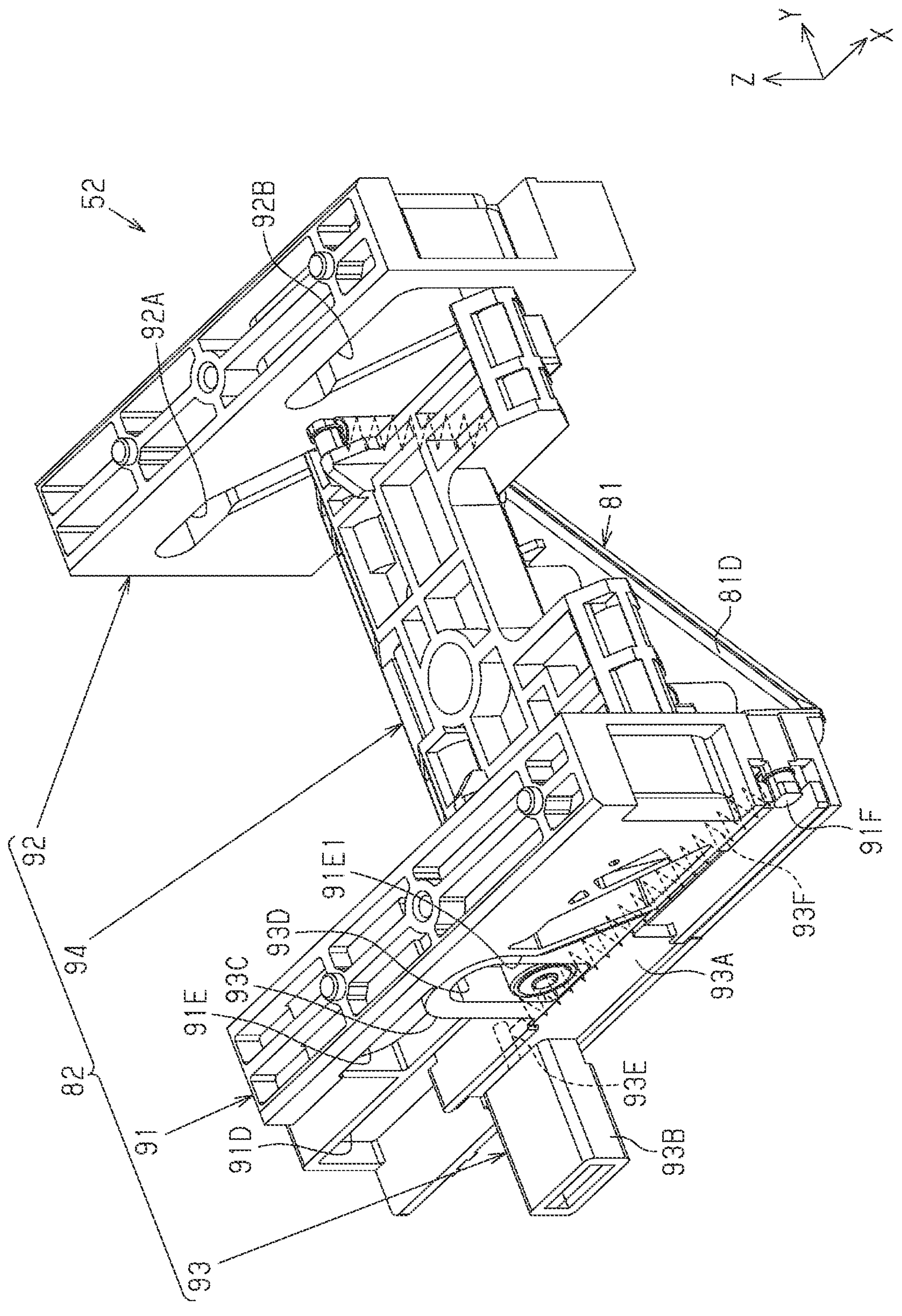
FIG. 7 is a perspective view of the wiping portion and the cleaning portion according to an embodiment.

As illustrated in FIG. 7, the cleaning portion 52 has a cleaning member 81 and a guide portion 82.

The guide portion 82 guides an operation of the cleaning member 81. The guide portion 82 has a first support member 91, a second support member 92, a lever 93, and a slider 94. The first support member 91 and the second support member 92 have a rectangular parallelepiped shape. The first support member 91 and the second support member 92 are fixed to the inside of the housing via a fixing member such as a frame (not illustrated). The first support member 91 and the second support member 92 are separated from each other in the direction along the Y axis. Long sides of the first support member 91 and the second support member 92 extend in the direction along the X axis.

Figure 8:
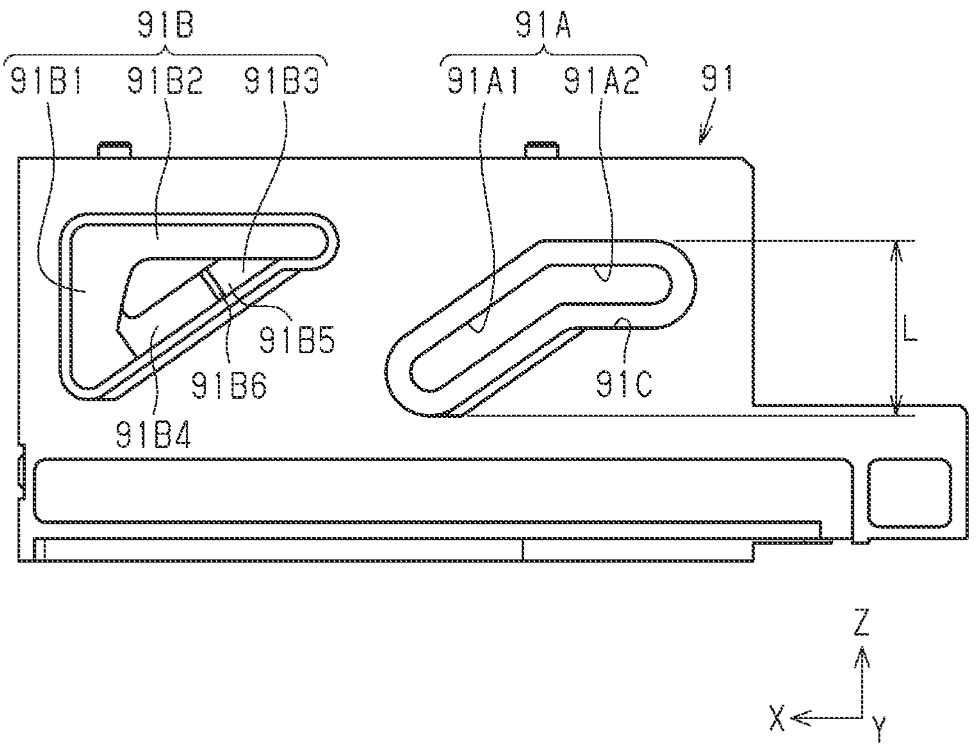
FIG. 8 is a front view of a first support member according to an embodiment when viewed from inside.

As illustrated in FIG. 8, the first support member 91 has a guide groove 91A and a cam groove 91B. The guide groove 91A and the cam groove 91B are arranged in the direction along the X axis. The guide groove 91A is located on a side farther from the cam groove 91B with respect to the wiping portion 51 located at the wiper start position P1 in the direction along the X axis. That is, the cam groove 91B is located on a side closer to the guide groove 91A with respect to the wiping portion 51 located at the wiper start position P1 in the direction along the X axis.

The guide groove 91A penetrates the first support member 91. The guide groove 91A has a first guide groove 91A1 and a second guide groove 91A2. The first guide groove 91A1 extends in a direction intersecting the direction along the X axis. The second guide groove 91A2 extends from an upper end of the first guide groove 91A1 along the X axis in a direction away from the cam groove 91B. The direction away from the cam groove 91B is also a direction in which the wiping portion 51 moves from the wiper start position P1 to the wiper home position P0.

The first support member 91 is provided with a roller guide hole 91C. An inner surface of the first support member 91 refers to a side surface of the first support member 91 that is closer to the second support member 92 of two side surfaces that are located opposite to each other in the direction along the Y axis. The roller guide hole 91C is provided along a contour of the guide groove 91A so as to surround the entire circumference of the guide groove 91A.

The cam groove 91B is provided on the inner surface of the first support member 91. The cam groove 91B has a right-angled triangular shape when viewed from the direction along the Y axis. The cam groove 91B has a first cam groove 91B1, a second cam groove 91B2, and a third cam groove 91B3.

The first cam groove 91B1 extends in a direction along the X axis. The first cam groove 91B1 is provided at a position slightly shifted upward from the second guide groove 91A2 in the direction along the Z axis. Here, the expression "upward" means a direction far from the wiping portion 51 in the direction along the Z axis.

The second cam groove 91B2 extends downward along the Z axis from a first end of the first cam groove 91B1. The first end of the first cam groove 91B1 refers to an end that is away from the guide groove 91A of two ends of the first cam groove 91B1 located opposite to each other in the direction along the X axis. Further, the expression "downward" here means a direction close to the wiping portion 51 in the direction along the Z axis.

The third cam groove 91B3 couples the end of the second cam groove 91B2 opposite to the first cam groove 91B1 and the vicinity of the second end of the first cam groove 91B1. The second end of the first cam groove 91B1 refers to an end that is close to the guide groove 91A of two ends of the first cam groove 91B1 located opposite to each other in the direction along the X axis. The third cam groove 91B3 extends in a direction intersecting the direction along the X axis. The third cam groove 91B3 is a portion corresponding to the hypotenuse of the right-angled triangle.

Figure 9:
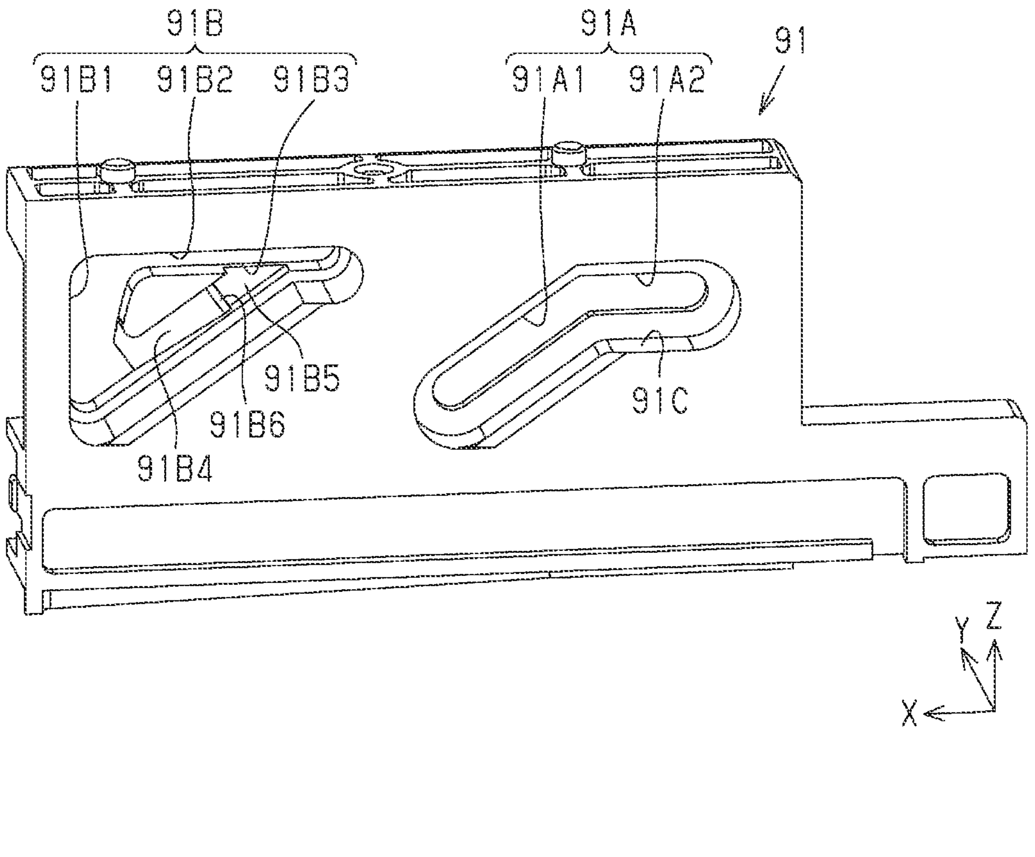
FIG. 9 is a perspective view of the first support member according to an embodiment when viewed from inside.

As illustrated in FIG. 9, the first cam groove 91B1 and the second cam groove 91B2 are set to have the same depth. Inner bottom surfaces of the first cam groove 91B1 and the second cam groove 91B2 are planes continuous with each other. The third cam groove 91B3 has an inclined surface 91B4 and a flat surface 91B5. The inclined surface 91B4 and the flat surface 91B5 form the inner bottom surface of the third cam groove 91B3.

The inclined surface 91B4 is inclined so that the depth of the third cam groove 91B3 becomes shallower from the second cam groove 91B2 toward the first cam groove 91B1. The depth of a portion of the third cam groove 91B3 corresponding to the flat surface 91B5 is set to be slightly shallower than the depth of the first cam groove 91B1. A holding portion 91B6 is provided at a boundary between the inclined surface 91B4 and the flat surface 91B5. The holding portion 91B6 is a stepped portion between the inclined surface 91B4 and the flat surface 91B5.

As illustrated in FIG. 7, the first support member 91 has a lever accommodating portion 91D, a stopper recess 91E, and a protrusion 91F for spring hooking. The lever accommodating portion 91D and the stopper recess 91E are provided on an outer surface of the first support member 91. An outer surface of the first support member 91 refers to a side surface that is far from the second support member 92 of two side surfaces of the first support member 91 located opposite to each other in the direction along the Y axis.

The lever accommodating portion 91D is a recess having a predetermined depth. The lever accommodating portion 91D extends in the direction along the X axis. A first end of the lever accommodating portion 91D protrudes from a side surface that is far from the wiping portion 51 located at the wiper start position P1 of two side surfaces of the first support member 91 located opposite to each other in the direction along the X axis. A second end of the lever accommodating portion 91D is open to the outside.

The stopper recess 91E is located above the lever accommodating portion 91D along the Z axis. The stopper recess 91E is provided in at least a range corresponding to the roller guide hole 91C in the direction along the X axis. The stopper recess 91E is open in the same direction as a direction in which the wiping portion 51 moves from the wiper start position P1 to the wiper home position P0 in the direction along the X axis. An unopen inner surface of the stopper recess 91E is used as a stopper surface 91E1.

The protrusion 91F for spring hooking is provided on the inner bottom surface of the lever accommodating portion 91D. The protrusion 91F is provided at a position closer to the second end of the lever accommodating portion 91D.

As illustrated in FIG. 7, the second support member 92 basically has the same configuration as the first support member 91. Therefore, a detailed description of the second support member 92 will be omitted. The second support member 92 has a guide groove 92A and a cam groove 92B, like the first support member 91. The guide groove 92A and the cam groove 92B have the same configuration as the guide groove 91A and the cam groove 91B of the first support member 91. However, the second support member 92 does not have a configuration corresponding to the roller guide hole 91C and the lever accommodating portion 91D.

As illustrated in FIG. 7, the lever 93 has a support portion 93A, a pressed portion 93B, and a coupling portion 93C.

The support portion 93A is a hollow rectangular parallelepiped shape. The support portion 93A extends in the direction along the X axis. A length of the support portion 93A in the direction along the X axis is set to be shorter than that of the lever accommodating portion 91D in the direction along the X axis. The support portion 93A is accommodated inside the lever accommodating portion 91D of the first support member 91. However, a portion of the support portion 93A corresponding to the stopper recess 91E protrudes outward from the lever accommodating portion 91D in the direction along the Y axis. The support portion 93A is slidable relative to the inner wall surface of the lever accommodating portion 91D in the direction along the X axis.

The pressed portion 93B is a rectangular parallelepiped shape. The pressed portion 93B is provided on an outer surface of the support portion 93A. The pressed portion 93B is provided at a position closer to a first end of the support portion 93A in the direction along the X axis. The first end of the support portion 93A is far from the wiping portion 51 located at the wiper start position P1 of two ends of the support portion 93A located opposite to each other in the direction along the X axis.

The coupling portion 93C is provided on an upper surface of a portion of the support portion 93A that protrudes outward from the lever accommodating portion 91D. The coupling portion 93C has an oblong hole 93D. The oblong hole 93D extends along the Z axis. A length of the oblong hole 93D in the direction along the Z axis is set to be substantially the same as a distance L between an uppermost portion and a lowest portion of the inner peripheral surface of the roller guide hole 91C.

A protrusion 93E for spring hooking is provided inside the support portion 93A. The protrusion 93E is provided at a position corresponding to, for example, the pressed portion 93B. A first end of a tension coil spring 93F is coupled to the protrusion 93E. A second end of the tension coil spring 93F is coupled to the protrusion 91F of the first support member 91. Therefore, the lever 93 is constantly urged by an elastic force of the tension coil spring 93F toward the same direction as the direction in which the wiping portion 51 moves from the wiper home position P0 to the wiper start position P1. The movement of the lever 93 in the same direction as the direction in which the wiping portion 51 moves from the wiper home position P0 to the wiper start position P1 is restricted by the coupling portion 93C abutting on the stopper surface 91E1.

Figure 10:
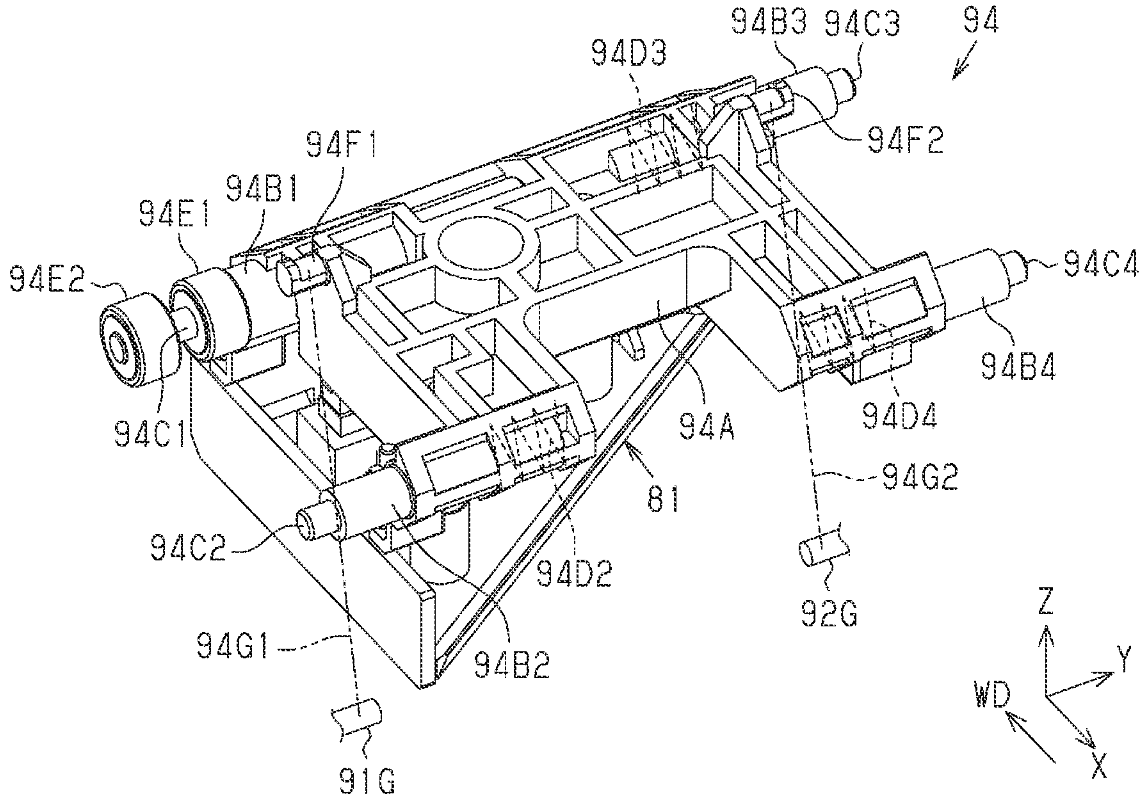
FIG. 10 is a perspective view of a slider according to an embodiment.

As illustrated in FIG. 10, the slider 94 has a rectangular parallelepiped shape. A long side of the slider 94 extends in the direction along the Y axis. A rectangular notch 94A is provided on a side edge of the slider 94 opposite to the wiping direction WD along the X axis. A cylindrical first shaft support portion 94B1, a second shaft support portion 94B2, a third shaft support portion 94B3, and a fourth shaft support portion 94B4 are provided at four corners of the slider 94, respectively. The first shaft support portion 94B1 and the third shaft support portion 94B3 extend in opposite directions along the Y axis. The first shaft support portion 94B1 and the third shaft support portion 94B3 are located on the same axis extending along the Y axis. The second shaft support portion 94B2 and the fourth shaft support portion 94B4 extend in opposite directions along the Y axis. The second shaft support portion 94B2 and the fourth shaft support portion 94B4 are located on the same axis extending along the Y axis.

The slider 94 has a first slider shaft 94C1, a second slider shaft 94C2, a third slider shaft 94C3, and a fourth slider shaft 94C4. The second to fourth slider shafts 94C2 to 94C4 are the same axis. The first slider shaft 94C1 is a so-called a drive shaft, and a length of the first slider shaft 94C1 in the direction along the Y axis is longer than lengths of the second to fourth slider shafts 94C2 to 94C4 in the direction along the Y axis. The lengths of the second to fourth slider shafts 94C2 to 94C4 in the direction along the Y axis are all the same length.

The first slider shaft 94C1 is fixed in a state of being inserted into the first shaft support portion 94B1. The first slider shaft 94C1 has a base end and a tip end. The base end is a portion inserted into the first shaft support portion 94B1. The tip end is a portion protruding outward from the first shaft support portion 94B1. The base end has an outer diameter larger than that of the tip end. The outer diameter of the tip end is the same as outer diameters of the second to fourth slider shafts 94C2 to 94C4.

A first guide roller 94E1 and a second guide roller 94E2 are mounted on the tip end of the first slider shaft 94C1. The first guide roller 94E1 and the second guide roller 94E2 are rotatable with respect to the tip end of the first slider shaft 94C1. The first guide roller 94E1 is closer to the base end of the first slider shaft 94C1 in the direction along the Y axis than the second guide roller 94E2. That is, the first guide roller 94E1 is located between the second guide roller 94E2 and the base end of the first slider shaft 94C1. The outer diameter of the first guide roller 94E1 is almost the same as a width of the roller guide hole 91C of the first support member 91. The width of the roller guide hole 91C refers to a length in a direction orthogonal to a direction in which the roller guide hole 91C extends. The outer diameter of the second guide roller 94E2 is almost the same as a width of the oblong hole 93D of the coupling portion 93C. The width of the oblong hole 93D refers to a length in a direction orthogonal to a direction in which the oblong hole 93D extends.

The second slider shaft 94C2 is inserted into the second shaft support portion 94B2 while being retained. The second slider shaft 94C2 is slidable to the second shaft support portion 94B2 in the direction along the Y axis. A compression coil spring 94D2 is interposed between an inner end of the second slider shaft 94C2 and an inner bottom portion of the second shaft support portion 94B2. The second slider shaft 94C2 is constantly urged toward a direction in which it protrudes from the second shaft support portion 94B2 by an elastic force of the compression coil spring 94D2. A tip end of the second slider shaft 94C2 is maintained while being exposed from the second shaft support portion 94B2.

The third slider shaft 94C3 is inserted into the third shaft support portion 94B3 while being retained. The third slider shaft 94C3 is slidable to the third shaft support portion 94B3 in the direction along the Y axis. A compression coil spring 94D3 is interposed between an inner end of the third slider shaft 94C3 and an inner bottom portion of the third shaft support portion 94B3. The third slider shaft 94C3 is constantly urged toward a direction in which it protrudes from the third shaft support portion 94B3 by an elastic force of the compression coil spring 94D3. A tip end of the third slider shaft 94C3 is maintained while being exposed from the third shaft support portion 94B3.

The fourth slider shaft 94C4 is inserted into the fourth shaft support portion 94B4 while being retained. The fourth slider shaft 94C4 is slidable to the fourth shaft support portion 94B4 in the direction along the Y axis. A compression coil spring 94D4 is interposed between an inner end of the fourth slider shaft 94C4 and an inner bottom portion of the fourth shaft support portion 94B4. The fourth slider shaft 94C4 is constantly urged toward a direction in which it protrudes from the fourth shaft support portion 94B4 by an elastic force of the compression coil spring 94D4. A tip end of the fourth slider shaft 94C4 is maintained while being exposed from the fourth shaft support portion 94B4.

Two protrusions 94F1 and 94F2 for spring hooking are provided on an upper surface of the slider 94. The protrusion 94F1 is provided on the same side as the first shaft support portion 94B1 and the second shaft support portion 94B2. The protrusion 94F1 protrudes in the same direction as the first shaft support portion 94B1 and the second shaft support portion 94B2 in the direction along the Y axis. The protrusion 94F2 is provided on the same side as the third shaft support portion 94B3 and the fourth shaft support portion 94B4. The protrusion 94F2 protrudes in the same direction as the third shaft support portion 94B3 and the fourth shaft support portion 94B4 in the direction along the Y axis.

A protrusion 91G for spring hooking is provided on a lower inner surface of the first support member 91. A first end of a first tension coil spring 94G1 is coupled to the protrusion 94F1. A second end of the first tension coil spring 94G1 is coupled to the protrusion 91G. Further, a protrusion 92G for spring hooking is provided on a lower inner surface of the second support member 92. A first end of a second tension coil spring 94G2 is coupled to the protrusion 94F2. A second end of the second tension coil spring 94G2 is coupled to the protrusion 92G. Therefore, the slider 94 is constantly urged downward by an elastic force of the first tension coil spring 94G1 and the second tension coil spring 94G2.

Cleaning Member

As illustrated in FIG. 10, the cleaning member 81 is mounted on a lower part of the slider 94.

Figure 11:
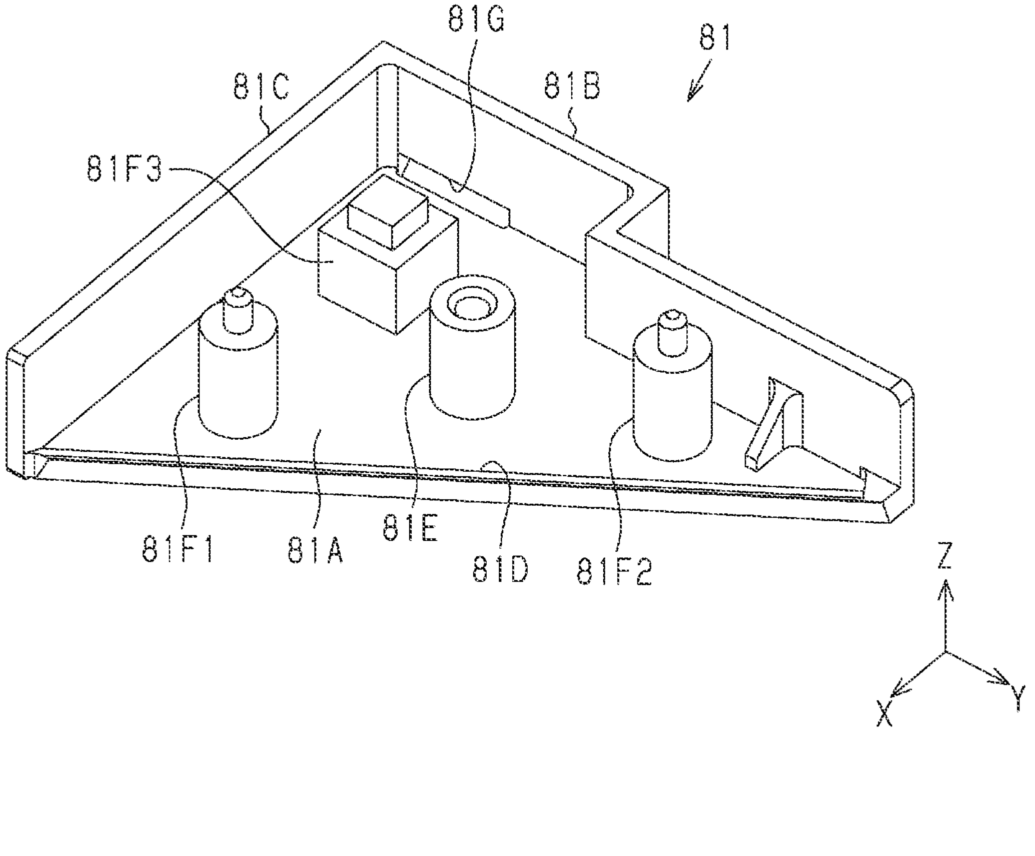
FIG. 11 is a perspective view of the wiping portion and the cleaning portion according to an embodiment.

As illustrated in FIG. 11, the cleaning member 81 has a bottom wall 81A, a first side wall 81B, a second side wall 81C, and a claw 81D.

The bottom wall 81A has a right-angled triangular shape when viewed from the direction along the Z axis. Of two sides of the bottom wall 81A that are orthogonal to each other, the first side extends along the Y axis and the second side extends along the X axis. The hypotenuse, which is the third side of the bottom wall 81A, extends in a direction intersecting the direction along the X axis. The degree of inclination of the hypotenuse of the bottom wall 81A with respect to the direction along the X axis is the same as the degree of inclination of the nozzle row of the liquid discharge head 21 with respect to the direction along the X axis.

A fixed portion 81E and three support portions 81F1, 81F2, and 81F3 are provided on an upper surface of the bottom wall 81A. The fixed portion 81E is provided in the vicinity of the center of the bottom wall 81A when viewed from the direction along the Z axis. The fixed portion 81E has a cylindrical shape. The three support portions 81F1, 81F2, and 81F3 are provided at three corners of the bottom wall 81A when viewed from the direction along the Z axis. The two support portions 81F1 and 81F2 are provided at two acute-angled corners at the bottom wall 81A. The remaining support portion 81F3 is provided at a right-angled corner at the bottom wall 81A. The two support portions 81F1 and 81F2 have a stepped cylindrical shape. The support portion 81F3 is a stepped square columnar shape.

The first side wall 81B is provided along the first side of the bottom wall 81A. That is, the first side wall 81B extends along the Y axis. The second side wall 81C is provided along the second side of the bottom wall 81A. That is, the second side wall 81C extends along the X axis. The first side wall 81B and the second side wall 81C are coupled to each other at a position corresponding to the right-angled corner of the bottom wall 81A.

The first side wall 81B has a flow path 81G. The flow path 81G is located near the corner where the first side wall 81B and the second side wall 81C intersect and in the vicinity of a boundary between the first side wall 81B and the bottom wall 81A. The flow path 81G is a rectangular hole extending in the direction along the Y axis and penetrates the first side wall 81B.

The claw 81D is provided on the upper surface of the bottom wall 81A. The claw 81D extends along the hypotenuse of the bottom wall 81A. That is, the degree of inclination of the claw 81D with respect to the direction along the X axis is the same as the degree of inclination of the nozzle row of the liquid discharge head 21 with respect to the direction along the X axis. A thickness of a tip end of the claw 81D is thinner than a thickness of a base end of the claw 81D.

The cleaning member 81 is fixed to the slider 94 as follows. That is, the cleaning member 81 is fixed to the lower part of the slider 94 by inserting a bolt (not illustrated) into the fixed portion 81E from below along the Z axis of the bottom wall 81A and tightening the bolt to the slider 94. The tip ends of the three support portions 81F1, 81F2, and 81F3 are maintained while being fitted into fitting holes (not illustrated) provided in the lower part of the slider 94, respectively.

Slider Support Structure

The slider 94 is supported as follows.

Figure 12:
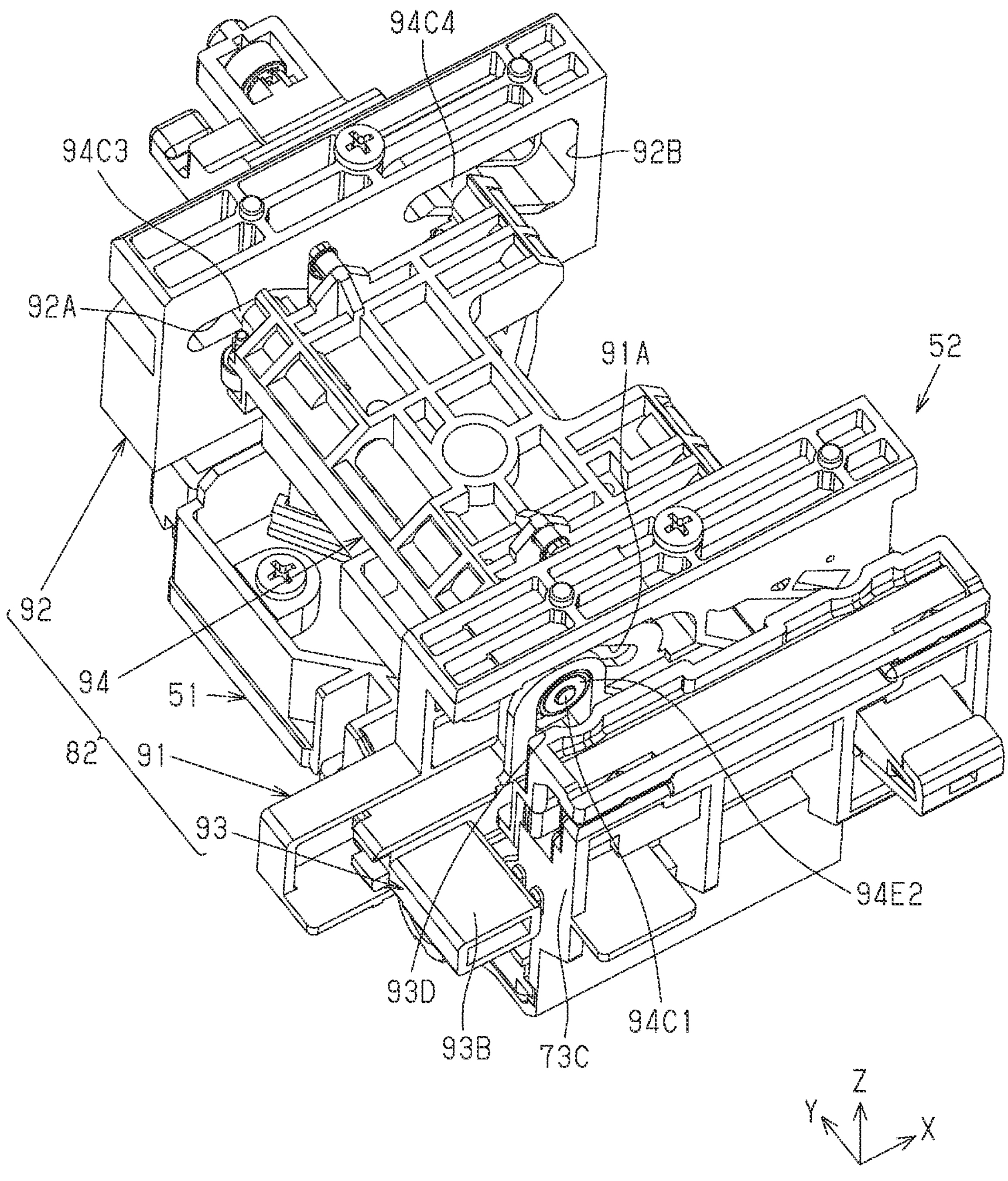
FIG. 12 is a perspective view of the wiping portion and the cleaning portion according to an embodiment.

As illustrated in FIG. 12, the third slider shaft 94C3 is inserted into the guide groove 92A of the second support member 92. The third slider shaft 94C3 is guided by the guide groove 92A. The fourth slider shaft 94C4 is inserted into the cam groove 92B of the second support member 92. The fourth slider shaft 94C4 is guided by the cam groove 92B.

The tip end of the first slider shaft 94C1 penetrates the guide groove 91A of the first support member 91 and is inserted into the oblong hole 93D. The first slider shaft 94C1 is guided by the guide groove 91A. The second slider shaft 94C2 is inserted into the cam groove 91B of the first support member 91. The second slider shaft 94C2 is guided by the cam groove 91B.

The second guide roller 94E2 mounted on the tip end of the first slider shaft 94C1 is located inside the oblong hole 93D of the lever 93. The second guide roller 94E2 is guided while rolling into the oblong hole 93D. Although not illustrated, the first guide roller 94E1 is located inside the roller guide hole 91C provided on the inner surface of the first support member 91. The first guide roller 94E1 is guided while rolling into the roller guide hole 91C.

The pressed portion 93B of the lever 93 is located on a movement locus of the abutting portion 73C in the movement support portion 73 along the X axis. The abutting portion 73C can abut on the pressed portion 93B of the lever 93 via the plurality of protrusions 73D.

When the movement support portion 73 is intended to move further in the wiping direction WD while the abutting portion 73C abuts on the pressed portion 93B, the lever 93 is intended to move in the wiping direction WD against the elastic force of the tension coil spring 93F. As the lever 93 moves, the first shaft support portion 94B1 is pressed in the wiping direction WD via the second guide roller 94E2 that engages with the oblong hole 93D of the coupling portion 93C. As a result, the first shaft support portion 94B1 moves in the wiping direction WD while being guided by the guide groove 91A via the first guide roller 94E1 and the second guide roller 94E2. Since the first shaft support portion 94B1 is fixed to the slider 94, the first shaft support portion 94B1, the slider 94, and the cleaning member 81 move integrally in the wiping direction WD in synchronization with the movement of the movement support portion 73.

As illustrated in FIG. 5, the liquid discharge apparatus 10 includes a detecting portion 50A. The detecting portion 50A is fixed inside the housing. The detecting portion 50A detects that the wiping portion 51 is located at a predetermined detection position.

Coupling Portion

As illustrated in FIG. 5, the coupling portion 30 is a part of the discharge member 30A fixed inside the housing. The coupling portion 30 has a cylindrical shape. The coupling portion 30 is located on the movement locus of the discharge portion 72C in the storage support portion 72 along the X axis. Further, the coupling portion 30 and the discharge portion 72C are located on the same axis extending along the X axis. The coupling portion 30 can be inserted relatively into the discharge portion 72C.

A discharge flow path (not illustrated) is provided inside the discharge member 30A. The discharge flow path is coupled to the waste liquid tank 63 via the pump 61. Further, the discharge member 30A is provided with an absorbent material accommodating portion 30B. The absorbent material accommodating portion 30B is located below the cleaning member 81 along the Z axis. The absorbent material accommodating portion 30B has a box shape that opens upward along the Z axis. An absorbent material 30C is accommodated inside the absorbent material accommodating portion 30B. The absorbent material 30C can absorb the printing liquid.

Processing Procedure of Control Device

Next, a processing procedure of the control portion 50 when cleaning the nozzle surface 21A will be described. The wiping portion 51 is located at the wiper home position P0.

Figure 13:
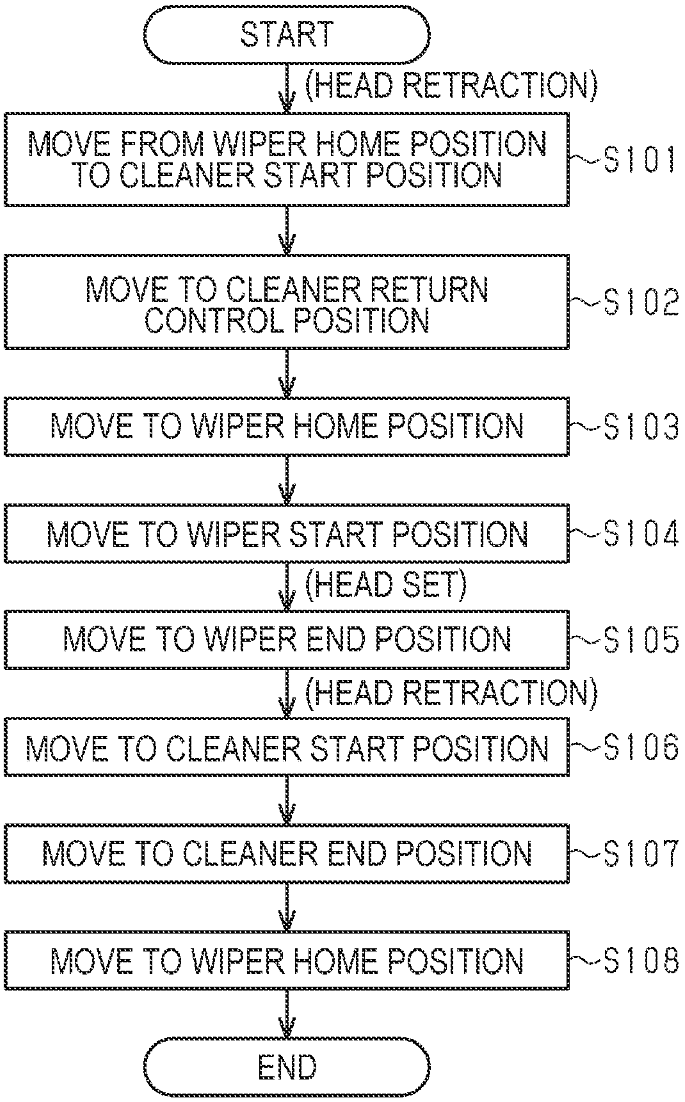
FIG. 13 is a flowchart illustrating a processing procedure of a control device according to an embodiment.

As illustrated in the flowchart of FIG. 13, when cleaning the nozzle surface 21A of the liquid discharge head 21, the control portion 50 first moves the liquid discharge head 21 from the set position to the retracted position through the head driving mechanism 24. As a result, interference between the nozzle surface 21A and the wiping member 71 is avoided.

Step S101

Next, the control portion 50 moves the wiping portion 51 from the wiper home position P0 to the cleaner start position P2 through the wiper driving mechanism 53 (step S101). The cleaner start position P2 is a position of the wiping portion 51 when the cleaning portion 52 starts to clean the wiping member 71. The wiping portion 51 moves in the direction opposite to the wiping direction WD.

Figure 14:
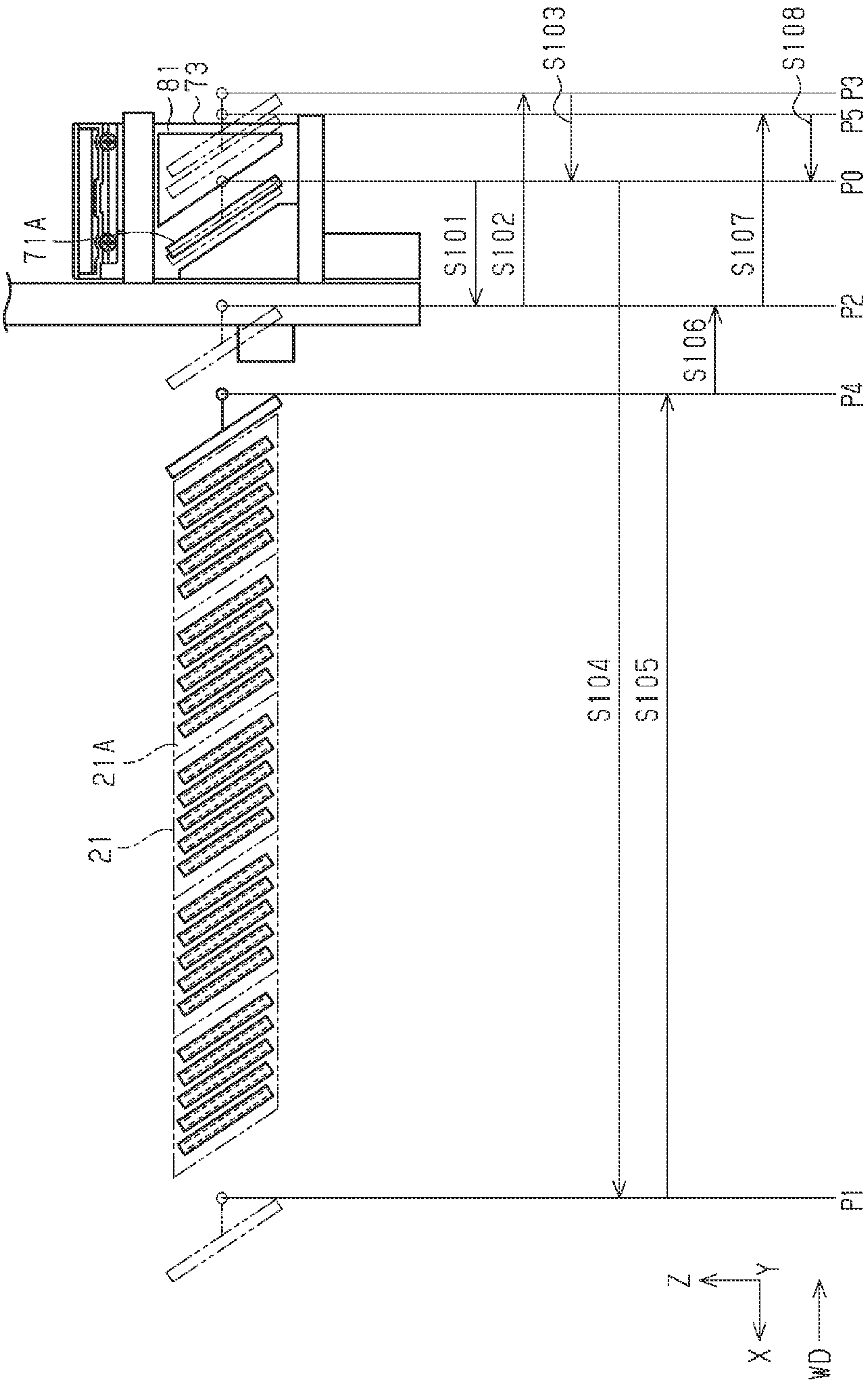
FIG. 14 is a schematic view of a liquid discharge apparatus according to an embodiment when viewed from above.

As illustrated in FIG. 14, the cleaner start position P2 is a position separated from the wiper home position P0 to the direction opposite to the wiping direction WD by a predetermined distance when viewed from above along the Z axis. Further, the cleaner start position P2 is also a position that does not overlap the nozzle surface 21A when viewed from above along the Z axis. However, in FIG. 14, the position of the wiping portion 51 indicates a position of the end of the nozzle surface wiping member 71A that is located closest to the wiping direction WD when viewed from above along the Z axis.

Figure 15:
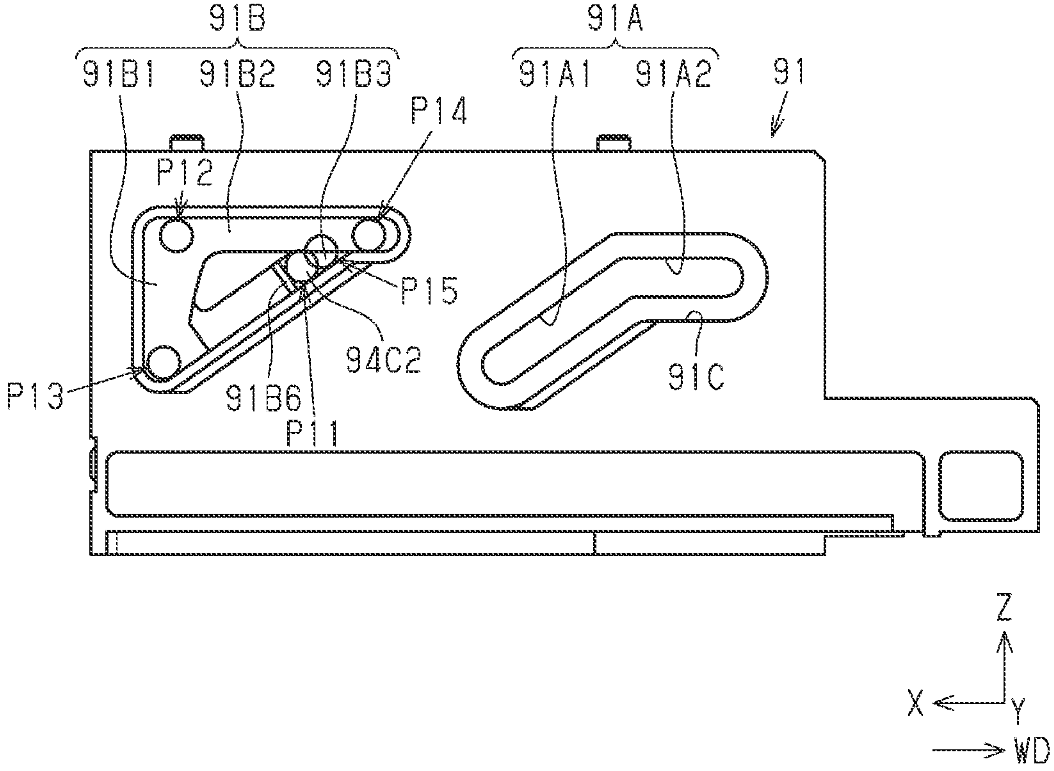
FIG. 15 is a front view of the first support member according to an embodiment when viewed from inside.
Figure 16:
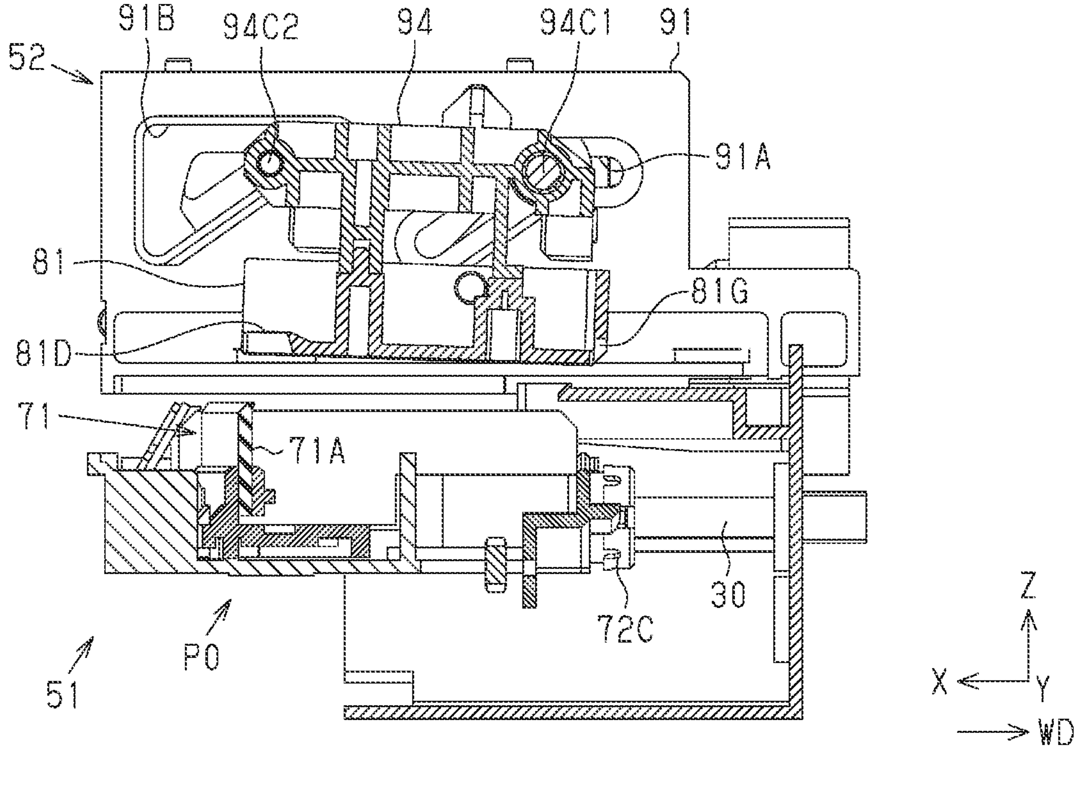
FIG. 16 is a cross-sectional view illustrating a position of a cleaning portion when the wiping portion according to an embodiment is located at a wiper home position.

As illustrated in FIG. 15, when the wiping portion 51 is located at the wiper home position P0, the second slider shaft 94C2 is located at a first position P11 of the cam groove 91B. The first position P11 is a position where the second slider shaft 94C2 is held by the holding portion 91B6 which is a step. The slider 94 is intended to move in a direction opposite to the wiping direction WD due to the elastic force of the tension coil spring 93F. However, the movement of the slider 94 in the direction opposite to the wiping direction WD is restricted by holding the second slider shaft 94C2 by the holding portion 91B6. Further, the slider 94 is constantly urged downward by an elastic force of the first tension coil spring 94G1 and the second tension coil spring 94G2. Therefore, the second slider shaft 94C2 is maintained while being pressed against the holding portion 91B6. As a result, the second slider shaft 94C2 is held at the first position P11 of the cam groove 91B. As illustrated in FIG. 16, when the wiping portion 51 is located at the wiper home position P0, the first slider shaft 94C1 is located in the second guide groove 91A2. Therefore, the cleaning member 81 is kept separated from the wiping member 71 in the direction along the Z axis.

Therefore, the wiping portion 51 independently moves from the wiper home position P0 to the cleaner start position P2.

Step S102

Next, as illustrated in the flowchart of FIG. 13, the control portion 50 moves the wiping portion 51 from the cleaner start position P2 to the cleaner return control position P3 through the wiper driving mechanism 53 (step S102). The wiping portion 51 moves in the wiping direction WD.

As illustrated in FIG. 14, the cleaner return control position P3 is a position separated from the wiper home position P0 to the wiping direction WD by a predetermined distance when viewed from above along the Z axis.

The detecting portion 50A detects that the wiping portion 51 has passed the wiper home position P0 on the way to the cleaner return control position P3. The control portion 50 resets the position of the wiping portion 51 when the wiper home position P0 of the wiping portion 51 is detected through the detecting portion 50A.

Moreover, the detecting portion 50A can detect that the wiping portion 51 is located at a detection position between the cleaner start position P2 which is a position of the wiping portion 51 when the cleaning member 81 starts to clean the wiping member 71 and the cleaner return control position P3 which is a position of the wiping portion 51 when the movement direction of the cleaning member 81 is switched from the wiping direction WD to the opposite direction thereof.

As illustrated in FIG. 15, as the wiping portion 51 moves toward the cleaner return control position P3, the second slider shaft 94C2 moves the third cam groove 91B3 in the cam groove 91B toward the first cam groove 91B1.

This is because the pressed portion 93B of the lever 93 is pressed in the wiping direction WD by the abutting portion 73C of the movement support portion 73. When the lever 93 is pressed, the slider 94 moves in the wiping direction WD against the elastic force of the tension coil spring 93F. Accordingly, the second slider shaft 94C2 enters the first cam groove 91B1 and moves in the wiping direction WD while being guided by the first cam groove 91B1. Consequently, the wiping portion 51 reaches a fourth position P14 of the cam groove 91B at the timing when it reaches the cleaner return control position P3. The fourth position P14 is a position in the first cam groove 91B1 and is a position slightly closer to the wiping direction WD than the position where the first cam groove 91B1 and the third cam groove 91B3 intersect.

Figure 19:
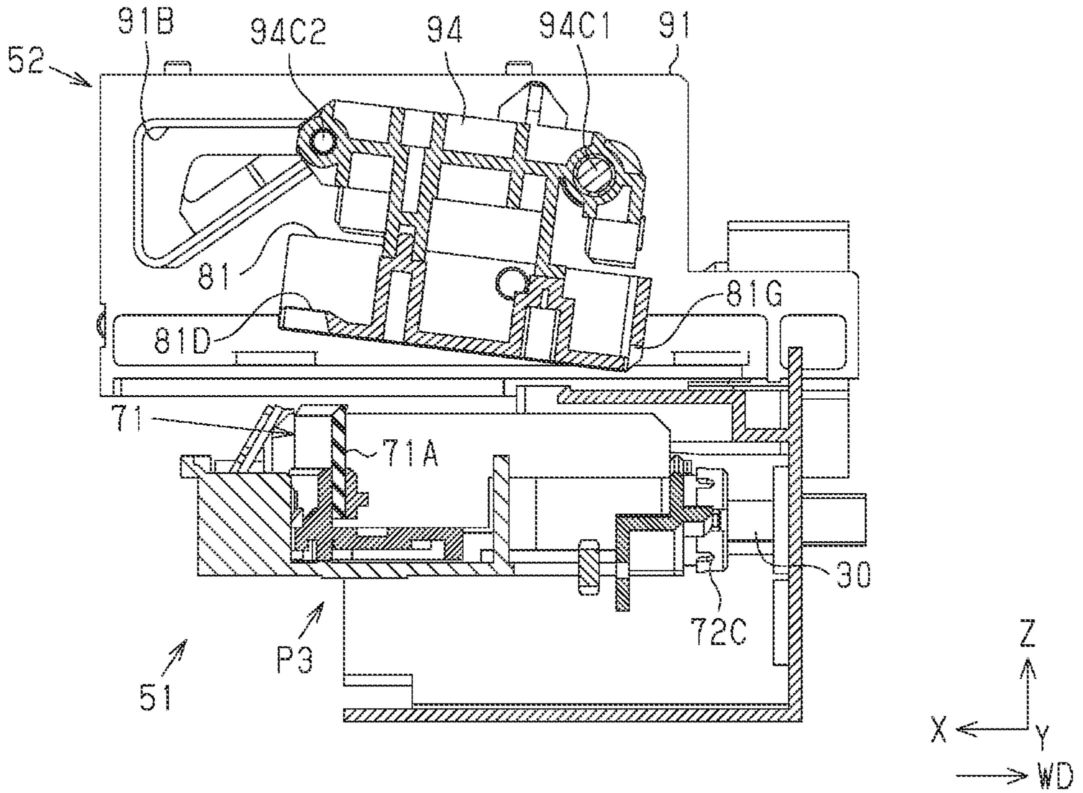
FIG. 19 is a cross-sectional view illustrating a position of the cleaning portion when the wiping portion according to an embodiment is located at a cleaner return control position.

As illustrated in FIG. 19, when the wiping portion 51 is located at the cleaner return control position P3, the first slider shaft 94C1 is located at the end of the second guide groove 91A2 opposite to the first guide groove 91A1. At this time, the slider 94 and the cleaning member 81 are inclined according to a difference in position between the first cam groove 91B1 and the second guide groove 91A2 in the direction along the Z axis. The first cam groove 91B1 is positioned at a position to be shifted upward along the Z axis with respect to the second guide groove 91A2. Therefore, a portion on a tip end side of the cleaning member 81 is located above a portion on a base end side of the cleaning member 81 along the Z axis. The portion on the tip end side of the cleaning member 81 refers to a portion on a side where the claw 81D of the cleaning member 81 that comes into contact with the wiping member 71 is provided. The portion on the base end side of the cleaning member 81 is a portion on a side opposite to the claw 81D in the direction along the X axis, and refers to a portion on a side where the flow path 81G is provided. When the wiping portion 51 is located at the cleaner return control position P3, the claw 81D of the cleaning member 81 and the nozzle surface wiping member 71A are separated from each other in the direction along the Z axis.

Step S103

Next, as illustrated in the flowchart of FIG. 13, the control portion 50 moves the wiping portion 51 from the cleaner return control position P3 to the wiper home position P0 through the wiper driving mechanism 53 (step S103). The wiping portion 51 moves in the direction opposite to the wiping direction WD.

As illustrated in FIG. 15, the second slider shaft 94C2 moves in the direction opposite to the wiping direction WD while being guided by the first cam groove 91B1. Consequently, the second slider shaft 94C2 reaches a position of the boundary between the first cam groove 91B1 and the third cam groove 91B3 at the timing when the wiping portion 51 reaches the wiper home position P0. At this time, the second slider shaft 94C2 does not enter the third cam groove 91B3. The second slider shaft 94C2 is supported at the position of the boundary between the first cam groove 91B1 and the third cam groove 91B3 by a step generated due to a difference between a depth of the first cam groove 91B1 and a depth of a portion of the third cam groove 91B3 in which the flat surface 91B5 is provided.

The process of steps S101 to S103 is an initial process before wiping the liquid discharge head 21 with the wiping member 71.

Step S104

Next, the control portion 50 moves the wiping portion 51 from the wiper home position P0 to the wiper start position P1 through the wiper driving mechanism 53 (step S104). The wiping portion 51 moves in the direction opposite to the wiping direction WD.

As illustrated in FIG. 14, the wiper start position P1 is a position separated from the liquid discharge head 21 to the direction opposite to the wiping direction WD by a predetermined distance when viewed from above along the Z axis. Further, the wiper start position P1 is also a position that does not overlap the nozzle surface 21A when viewed from above along the Z axis. That is, the liquid discharge head 21 is located between the wiper start position P1 and the wiper home position P0 when viewed from above along the Z axis.

The slider 94 is constantly urged in the direction opposite to the wiping direction WD by the elastic force of the tension coil spring 93F. Therefore, the slider 94 moves in the direction opposite to the wiping direction WD following the movement of the wiping portion 51 toward the wiper start position P1.

As illustrated in FIG. 15, as the second slider shaft 94C2 moves toward the wiper start position P1 of the wiping portion 51, the second slider shaft 94C2 moves the first cam groove 91B1 in the direction opposite to the wiping direction WD. Consequently, the second slider shaft 94C2 reaches a second position P12 of the cam groove 91B. The second position P12 is a position where the first cam groove 91B1 and the second cam groove 91B2 in the cam groove 91B intersect each other. The second slider shaft 94C2 that has reached the second position P12 moves downward while being guided by the second cam groove 91B2 due to the elastic force of the first tension coil spring 94G1 and the second tension coil spring 94G2. Consequently, the second slider shaft 94C2 reaches a third position P13. The third position P13 is a lower end of the second cam groove 91B2, and is an end opposite to the second position P12. As the second slider shaft 94C2 moves downward, the slider 94 and the cleaning member 81 integrally move downward.

Figure 17:
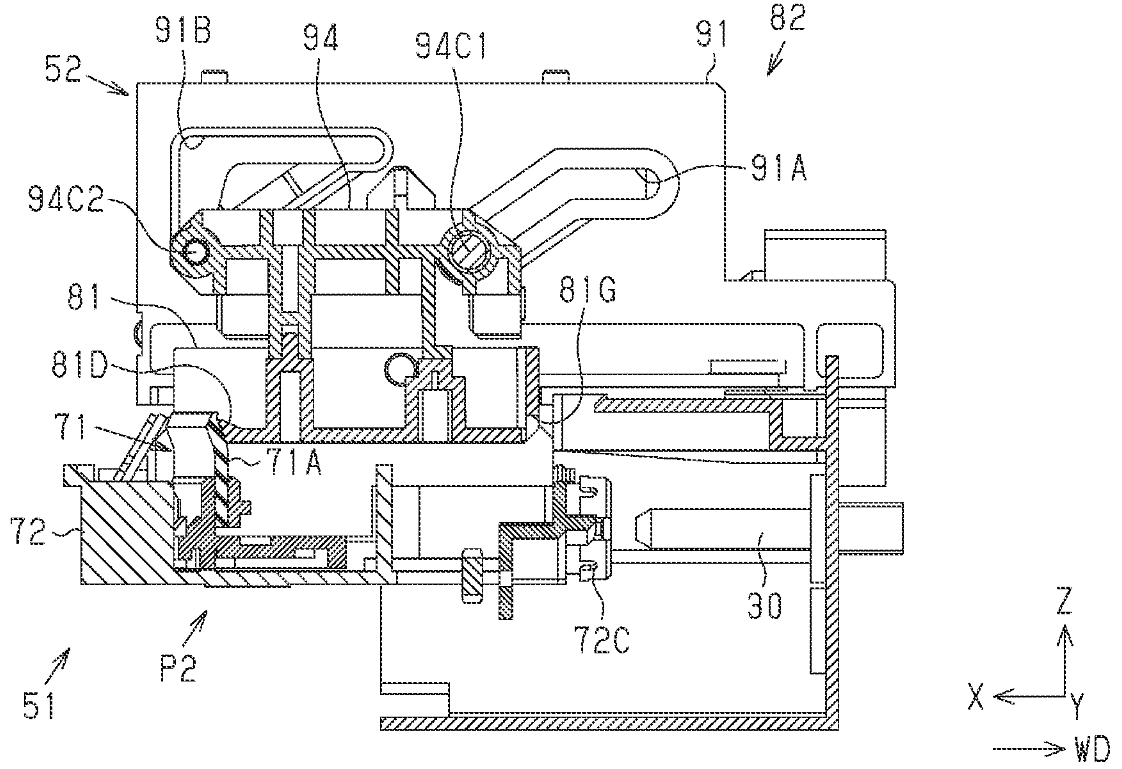
FIG. 17 is a cross-sectional view illustrating a position of the cleaning portion when the wiping portion according to an embodiment is located at a cleaner start position.

As illustrated in FIG. 17, when the second slider shaft 94C2 is held at the third position P13, the first slider shaft 94C1 is located on a lower end of the first guide groove 91A1. Further, when the second slider shaft 94C2 is held at the third position P13, the slider 94 is held at a position lower than a position when the wiping portion 51 is held at the wiper home position P0. The claw 81D of the cleaning member 81 is located on the movement locus of the nozzle surface wiping member 71A along the X axis. That is, the claw 81D of the cleaning member 81 can come into contact with an upper portion of the nozzle surface wiping member 71A in the direction along the X axis.

Thereafter, the control portion 50 moves the liquid discharge head 21 from the retracted position to the set position through the head driving mechanism 24. As a result, the liquid discharge head 21 can be wiped with the wiping member 71.

Step S105

As illustrated in the flowchart of FIG. 13, the control portion 50 moves the wiping portion 51 from the wiper start position P1 to a wiper end position P4 through the wiper driving mechanism 53 (step S105). The wiping portion 51 moves in the wiping direction WD.

As illustrated in FIG. 14, the wiper end position P4 is a position where the nozzle surface wiping member 71A has passed the nozzle surface 21A in the wiping direction WD.

As the wiping portion 51 moves toward the wiper end position P4, the nozzle surface wiping member 71A slides against the nozzle surface 21A along the X axis to wipe the printing liquid adhering to the nozzle surface 21A. In addition, the side surface wiping member 71B wipes the side surface of the liquid discharge head 21 that intersects the nozzle surface 21A in the direction along the Z axis. The side surface wiping member 71B captures the printing liquid removed from the nozzle surface wiping member 71A.

After the wiping portion 51 reaches the wiper end position P4, the control portion 50 moves the liquid discharge head 21 from the set position to the retracted position through the head driving mechanism 24.

Step S106

As illustrated in the flowchart of FIG. 13, the control portion 50 moves the wiping portion 51 from the wiper end position P4 to the cleaner start position P2 through the wiper driving mechanism 53 (step S106).

Before the wiping portion 51 reaches the cleaner start position P2, the second slider shaft 94C2 has been already held at the third position P13 of the cam groove 91B through the execution of the process of steps preceding step S104.

As illustrated in FIG. 17, the claw 81D of the cleaning member 81 is located on the movement locus of the nozzle surface wiping member 71A along the X axis. Therefore, at the timing when the wiping portion 51 reaches the cleaner start position P2, the tip end of the nozzle surface wiping member 71A elastically comes into contact with the claw 81D of the cleaning member 81 in the wiping direction WD. The tip end of the nozzle surface wiping member 71A is maintained while being bent in the direction opposite to the wiping direction WD. Further, at the timing when the wiping portion 51 reaches the cleaner start position P2, the abutting portion 73C of the movement support portion 73 abuts on the pressed portion 93B of the lever 93 via the plurality of protrusions 73D in the wiping direction WD.

Step S107

As illustrated in the flowchart of FIG. 13, the control portion 50 moves the wiping portion 51 from the cleaner start position P2 to the cleaner end position P5 through the wiper driving mechanism 53 (step S107).

The wiping portion 51 moves in the wiping direction WD. A coupling portion 30 is inserted into the discharge portion 72C as the wiping portion 51 moves toward the cleaner end position P5.

As illustrated in FIG. 14, the cleaner end position P5 is a position between the wiper home position P0 to the cleaner return control position P3 when viewed from above along the Z axis.

As illustrated in FIG. 15, when the wiping portion 51 is located at the cleaner end position P5, the second slider shaft 94C2 is located at a fifth position P15 of the cam groove 91B. The fifth position P15 is a position in the vicinity of a boundary with the first cam groove 91B1 in the flat surface 91B5 of the third cam groove 91B3.

Figure 18:
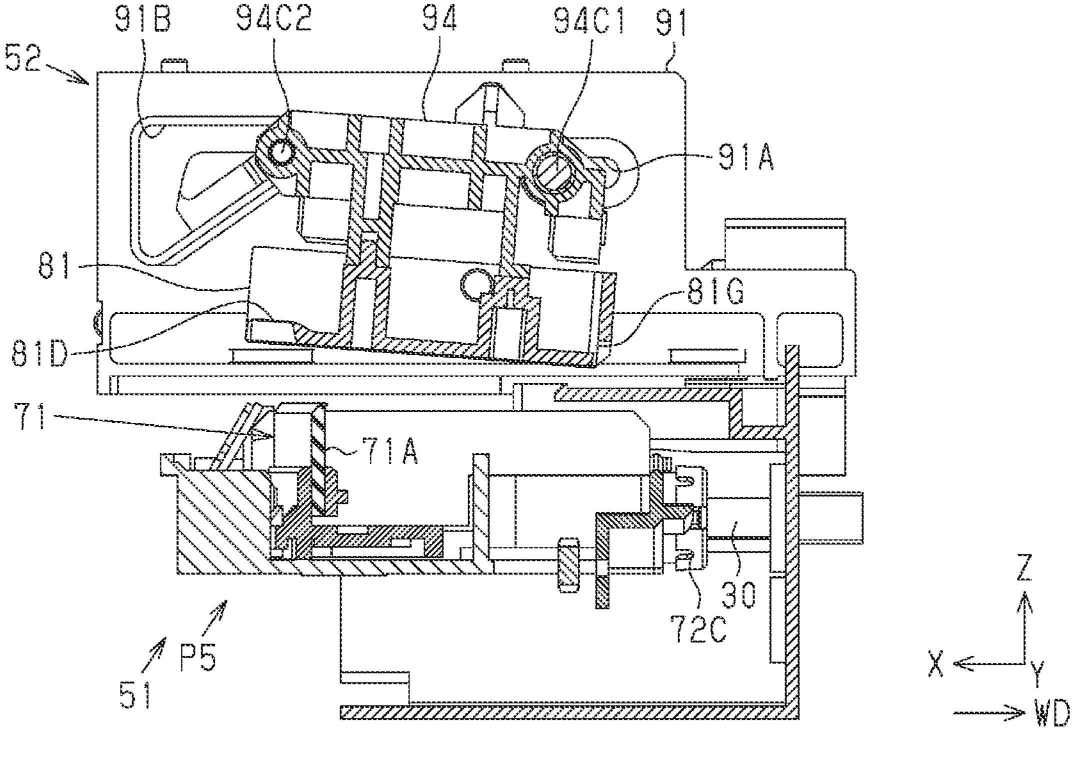
FIG. 18 is a cross-sectional view illustrating a position of the cleaning portion when the wiping portion according to an embodiment is located at a cleaner end position.

As illustrated in FIG. 18, when the wiping portion 51 is located at the cleaner end position P5, the first slider shaft 94C1 is located inside the second guide groove 91A2.

As the wiping portion 51 moves toward the cleaner end position P5, the pressed portion 93B of the lever 93 is pressed in the wiping direction WD by the abutting portion 73C of the movement support portion 73. Accordingly, the slider 94 moves in the wiping direction WD integrally with the cleaning member 81 against the elastic force of the tension coil spring 93F. That is, the slider 94 follows the wiping portion 51 that moves from the cleaner start position P2 to the cleaner end position P5, and moves integrally with the cleaning member 81 in the wiping direction WD.

As illustrated in FIG. 15, as the wiping portion 51 moves toward the cleaner end position P5, the second slider shaft 94C2 moves the third cam groove 91B3 toward the first cam groove 91B1. The second slider shaft 94C2 moves toward the holding portion 91B6, which is a step, while being guided by the inclined surface 91B4 of the third cam groove 91B3. At this time, the second slider shaft 94C2 is pushed into the inside of the second shaft support portion 94B2 against the elastic force of the compression coil spring 94D2 according to the inclination of the inclined surface 91B4. Consequently, the second slider shaft 94C2 jumps over the holding portion 91B6. The second slider shaft 94C2 then moves toward the direction in which it protrudes from the second shaft support portion 94B2 by the elastic force of the compression coil spring 94D2. As a result, the tip end of the second slider shaft 94C2 falls into the flat surface 91B5 of the third cam groove 91B3. Consequently, the second slider shaft 94C2 reaches the fifth position P15 of the cam groove 91B at the timing when the wiping portion 51 reaches the cleaner end position P5.

With the movement of the second slider shaft 94C2, the first slider shaft 94C1 rises toward the second guide groove 91A2 while being guided by the first guide groove 91A1. The second slider shaft 94C2 rises toward the holding portion 91B6 while being guided by the inclined surface 91B4. As a result, the slider 94 and the cleaning member 81 rise integrally along the third cam groove 91B3 and the first guide groove 91A1. That is, when a direction in which the liquid discharge head 21 discharges the printing liquid is defined as a discharge direction, the cleaning member 81 moves in a direction opposite to the discharge direction while being guided by the guide portion 82. With the movement of the cleaning member 81, the claw 81D of the cleaning member 81 scrapes up and wipe the printing liquid adhering to the nozzle surface wiping member 71A. The nozzle surface wiping member 71A is cleaned by scraping off the printing liquid adhering to itself by the claw 81D. The third cam groove 91B3 is used as a cleaning path for the cleaning member 81 when cleaning the wiping member 71.

The first slider shaft 94C1 reaches the second guide groove 91A2 at the timing when the second slider shaft 94C2 jumps over the holding portion 91B6 and falls into the flat surface 91B5. Thereafter, the slider 94 and the cleaning member 81 are inclined clockwise around the first slider shaft 94C1 according to a difference in position between the first slider shaft 94C1 and the second slider shaft 94C2 in a direction along the Z axis. That is, as the wiping portion 51 moves toward the cleaner end position P5, the portion of the cleaning member 81 on the tip end side in contact with the wiping member 71 rises higher than the portion on the base end side. The portion of the cleaning member 81 on the tip end side where the claw 81D is provided moves in a direction away from the nozzle surface wiping member 71A in the direction along the Z axis.

The flow path 81G is provided at a portion on the base end side of the cleaning member 81. The printing liquid stored through the cleaning of the nozzle surface wiping member 71A can be discharged outside the cleaning member 81 via the flow path 81G. The printing liquid discharged outside the cleaning member 81 drops to the absorbent material 30C located below the cleaning member 81. The dropped printing liquid is absorbed by the absorbent material 30C.

Step S108

As illustrated in the flowchart of FIG. 13, the control portion 50 finally moves the wiping portion 51 from the cleaner end position P5 to the wiper home position P0 through the wiper driving mechanism 53 (step S108).

The wiping portion 51 moves in the direction opposite to the wiping direction WD. The slider 94 follows the wiping portion 51 and moves in the direction opposite to the wiping direction WD due to the elastic force of the tension coil spring 93F.

The slider 94 is constantly urged downward by an elastic force of the first tension coil spring 94G1 and the second tension coil spring 94G2. Therefore, as the wiping portion 51 moves toward the wiper home position P0, the second slider shaft 94C2 moves from the fifth position P15 to the first position P11 while being guided by the third cam groove 91B3. The second slider shaft 94C2 is held by the holding portion 91B6 which is a step.

When the wiping portion 51 is held at the wiper home position P0, the coupling portion 30 is maintained in a state of being inserted into the discharge portion 72C. Therefore, the waste liquid stored in the storage portion 72A can be discharged to the waste liquid tank 63 through the driving of the pump 61.

A series of cleaning operations for the liquid discharge head 21 and the wiping member 71 is hereby completed.

When the liquid discharge head 21 and the wiping member 71 are cleaned, the above steps S101 to S108 are repeated again. The first cam groove 91B1 and the second cam groove 91B2 are used as a return path for returning the cleaning member 81 after cleaning the wiping member 71 to the third cam groove 91B3 which is a cleaning path. The return path passes through a position located higher than the cleaning path.

Moreover, the control portion 50 may make a moving speed of the wiping portion 51 different according to the steps in the flowchart of FIG. 13. For example, when a load applied to the wiping portion 51 is small, the control portion 50 moves the wiping portion 51 at a first moving speed. Further, when a wiping performance is important or when the load applied to the wiping portion 51 is large and a stopping control for the wiping portion 51 is required, the control portion 50 moves the wiping portion 51 at a second moving speed that is slower than the first moving speed.

The time when the load applied to the wiping portion 51 is small is, for example, the time when the process of step S104 is executed. The time when the wiping performance is important is, for example, the time when the process of step S105 is executed. The time when the load applied to the wiping portion 51 is large and the stopping control of the wiping portion 51 is required is, for example, a time when the processes of steps S101 to S103, step S107, and step S108 are executed. When the process of step S106 is executed, the control portion 50 may move the wiping portion 51 at a speed slower than the first moving speed and faster than the second moving speed.

Effect of Present Embodiment

Therefore, the present embodiment can obtain the following effects.

(1) When the nozzle surface wiping member 71A is cleaned, the cleaning member 81 rises while following the wiping portion 51 and moving in the wiping direction WD. With the operation of the cleaning member 81, the claw 81D scrapes up and wipe the printing liquid adhering to the nozzle surface wiping member 71A. Therefore, an abutting state of the nozzle surface wiping member 71A and the claw 81D is hardly changed during the operation of the cleaning member 81. That is, the abutting state of the claw 81D with respect to the nozzle surface wiping member 71A is kept constant. The abutting state also includes a strength of abutting the claw 81D with respect to the nozzle surface wiping member 71A. Therefore, the printing liquid adhering to the nozzle surface wiping member 71A can be uniformly wiped.

(2) When the nozzle surface wiping member 71A is cleaned, the cleaning member 81 rises while following the wiping portion 51 and moving in the wiping direction WD. As the cleaning member 81 rises, the abutting state of the nozzle surface wiping member 71A and the claw 81D is consequently released. Therefore, the waste liquid adhering to the claw 81D of the cleaning member 81 is prevented from re-adhering to the nozzle surface wiping member 71A.

(3) The cleaning member 81 operates by using a driving force of the wiping portion 51. It is not necessary to provide a separate driving mechanism for operating the cleaning member 81. Therefore, product costs can be reduced.

(4) When the abutting state of the nozzle surface wiping member 71A and the claw 81D is released, the portion of the cleaning member 81 on the tip end side where the claw 81D is provided is located on an upper side from the base end side of the cleaning member 81. Therefore, the printing liquid wiped with the claw 81D can be guided from the tip end side to the base end side of the cleaning member 81.

(5) The second slider shaft 94C2 is held by the holding portion 91B6, and the position of the slider 94 is thus held when the abutting state of the nozzle surface wiping member 71A and the claw 81D of the cleaning member 81 is released. Therefore, when the cleaning operation is not required, such as at the time of the initial operation when power is supplied, the wiping portion 51 can be moved independently.

(6) The wiping portion 51 moves to the cleaner return control position P3, and the second slider shaft 94C2 thus moves to the first cam groove 91B1, which is a return path, to the cleaning path. Here, the return path passes through the position located higher than the cleaning path. Thereafter, the wiping portion 51 moves in the direction opposite to the wiping direction WD, such that the second slider shaft 94C2 reaches a position where it can enter the third cam groove 91B3, which is a cleaning path, via the return path. Accordingly, the cleaning member 81 moves to a position where the claw 81D of the cleaning member 81 and the nozzle surface wiping member 71A abuts against each other. Therefore, when the cleaning member 81 returns to the cleaning path, it is possible to prevent the cleaning member 81 from interfering with the movement of the wiping portion 51, and the cleaning member 81 can perform cleaning operation only when the cleaning of the nozzle surface wiping member 71A is required.

(7) When the wiping portion 51 is located at the wiper home position P0, the coupling portion 30 is maintained in a state of being coupled to the discharge portion 72C. Therefore, the waste liquid can be discharged by driving the pump 61. In addition, the waste liquid is more reliably guided to the waste liquid tank 63, such that a periphery of the cleaning member 81 is prevented from being contaminated with the waste liquid.

(8) The waste liquid wiped with the wiping member 71 is stored in the storage portion 72A. The discharge portion 72C is located at a position higher than the bottom wall, which is the lowermost portion of the storage portion 72A. Therefore, the waste liquid is efficiently collected in the storage portion 72A.

(9) The storage portion 72A and the discharge portion 72C communicate with each other via a narrow communication path 72B. The communication path 72B has a portion in which the waste liquid stored in the storage portion 72A flows in the direction opposite to a wiping direction WD. Therefore, it is possible to prevent the waste liquid stored in the storage portion 72A from accidentally dripping from the discharge portion 72C when the wiping portion 51 decelerates.

(10) The nozzle surface wiping member 71A is inclined with respect to the wiping direction WD. The side surface wiping member 71B is located behind the rear end of the nozzle surface wiping member 71A, assuming the wiping direction WD as the front. Therefore, the printing liquid remaining on the nozzle surface 21A can be wiped with the side surface wiping member 71B after wiping with the nozzle surface wiping member 71A. Therefore, the nozzle surface 21A can be kept clean.

(11) The wiping portion 51 sequentially moves to the wiper home position P0, the cleaner return control position P3, the wiper end position P4, the cleaner start position P2, and the cleaner end position P5, and then returns to the wiper home position P0. The cleaning member 81 can be operated by using the operation of the wiping portion 51. Therefore, it is not necessary to provide a separate driving mechanism for operating the cleaning member 81.

(12) The detecting portion 50A can detect the wiping portion 51 located between the wiper home position P0 and the cleaner end position P5. Therefore, for example, during the initial operation, the initial operation of the wiping portion 51 can be performed with the cleaning member 81 separated from the wiping member 71. Further, the cleaner end position P5 and the cleaner return control position P3 are required to have position accuracy of the wiping portion 51 in relation to the guide portion 82. The control portion 50 can grasp the position of the wiping portion 51 through the detecting portion 50A. Therefore, variations in control positions of the cleaner end position P5 and the cleaner return control position P3 can be prevented.

(13) For example, when a load applied to the wiping portion 51 is small, the control portion 50 moves the wiping portion 51 at a first moving speed. Further, when a wiping performance is important or when the load applied to the wiping portion 51 is large and a stopping control for the wiping portion 51 is required, the control portion 50 moves the wiping portion 51 at a second moving speed that is slower than the first moving speed. Therefore, it is possible to shorten the operating time of the wiping portion 51. In addition, reliability of the operation of the wiping portion 51 at each position can be improved.

Other Embodiments

The present embodiment may be modified as follows.

The embodiments and the following modification examples may be combined with each other as long as they are not technically in conflict with each other.

Figure 20:
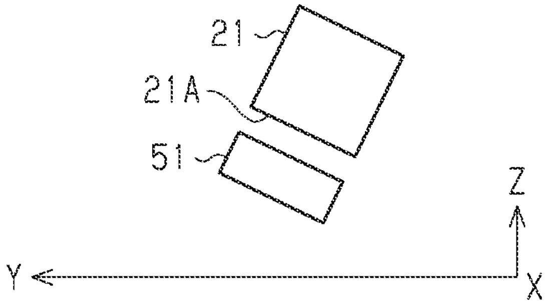
FIG. 20 is a schematic view illustrating a posture of a liquid discharge head according to another embodiment.

As illustrated in FIG. 20, the liquid discharge head 21 may be configured to discharge the printing liquid onto the medium while being inclined with respect to the XY plane which is a horizontal plane. The wiping portion 51 is configured to wipe the liquid discharge head 21 in an inclined state.

Technical Concepts

Hereinafter, technical concepts and effects thereof understood from the above-described embodiments and modification examples will be described.

(A) A wiping module includes a wiping portion including a wiping member wiping a liquid discharge head that discharges a liquid from a nozzle provided on a nozzle surface, a storage support portion supporting the wiping member and configured to store the liquid by the wiping, and a movement support portion mounting the storage support portion and configured to reciprocate along a wiping direction, which is a direction in which the wiping is performed, and a cleaning portion cleaning the wiping member. The cleaning portion includes a cleaning member and a guide portion guiding the cleaning member. The cleaning member is configured to follow a movement of the wiping portion in the wiping direction and to scrape off the liquid adhering to the wiping member while being guided by the guide portion.

With this configuration, since the wiping member and the cleaning member perform cleaning while moving in the same direction, it is possible to prevent a change in the contact state during cleaning. Therefore, the liquid adhering to the wiping member can be wiped uniformly.

(B) In the wiping module, when a direction in which the liquid discharge head discharges the liquid is defined as a discharge direction, the cleaning member may move in a direction opposite to the discharge direction while being guided by the guide portion, so that the liquid adhering to the wiping member may be scraped off.

With this configuration, since the wiping member and the cleaning member clean the wiping member while moving in the same direction, it is possible to prevent a change in the contact state during cleaning. Further, the cleaning member moves to the direction opposite to the discharge direction while being guided by the guide portion, such that the liquid adhering to the cleaning member is prevented from readhering to the wiping member.

(C) In the wiping module, the cleaning member may be configured such that a tip end side in contact with the wiping member rises higher than a base end side as the wiping portion moves in the wiping direction.

With this configuration, it is possible to prevent the liquid after the cleaning from dripping from the tip end side of the cleaning member.

(D) In the wiping module, a flow path for flowing the liquid stored by cleaning to an outside of the cleaning member may be provided on the base end side of the cleaning member.

With this configuration, the liquid after the cleaning can be discharged.

(E) In the wiping module, the guide portion may include a holding portion configured to temporarily hold the cleaning member at a position where the wiping member and the cleaning member do not come into contact with each other.

With this configuration, the wiping portion can move independently when the operation of the cleaning member is not required.

(F) In the wiping module, the guide portion may include a cleaning path of the cleaning member when cleaning the wiping member, and a return path of the cleaning member after cleaning the wiping member. The return path may pass through a position higher than the cleaning path.

With this configuration, when the cleaning member returns, it is possible to prevent the cleaning member from interfering with a movement of the wiping portion.

(G) In the wiping module, the wiping member may include a nozzle surface wiping member wiping the nozzle surface, and a side surface wiping member wiping a side surface of the liquid discharge head that intersects the nozzle surface. When wiping the liquid discharge head, the side surface wiping member may be disposed behind the nozzle surface wiping member when assuming the wiping direction as a front.

With this configuration, the liquid remaining on the side surface of the liquid discharge head can be wiped with the side surface wiping member after wiping with the nozzle surface wiping member.

(H) A discharge module includes a liquid discharge head discharging a liquid and the wiping module.

With this configuration, the same effect as the wiping module can be obtained.

(I) A liquid discharge apparatus includes a liquid discharge head discharging a liquid, the wiping module, a coupling portion configured to be coupled to the storage support portion, and a decompression mechanism configured to reduce a pressure of the coupling portion.

With this configuration, the liquid stored by the storage support portion can be sucked and discharged.

(J) In the liquid discharge apparatus, the storage support portion may include a storage portion storing the liquid, a discharge portion coming into contact with and separated from the coupling portion by a movement of the wiping portion, and a communication path communicating with the storage portion and the discharge portion. The discharge portion may be provided at a position higher than a lowermost portion of the storage portion. At least a part of the communication path may extend in the direction opposite to the wiping direction.

With this configuration, it is possible to prevent the liquid stored by the storage support portion from dripping from the discharge portion when the wiping portion moving in the wiping direction decelerates.

(K) The liquid discharge apparatus may further include a detecting portion that detects that the wiping portion is at a detection position between a position of the wiping portion when the cleaning member starts to clean the wiping member and a position of the wiping portion when the cleaning member is switched from a movement to the wiping direction to a movement to the direction opposite to the wiping direction.

With this configuration, the position of the wiping portion can be initialized every time.

(L) In the above liquid discharge apparatus, the liquid discharge head may be configured to discharge the liquid to the medium while being inclined from a horizontal plane. The wiping portion may wipe the liquid discharge head in an inclined state.

With this configuration, the same effect as the liquid discharge apparatus can be obtained even in the liquid discharge apparatus provided with the inclined liquid discharge head.

(M) A wiping method is a wiping method of a wiping module which includes a wiping portion including a wiping member wiping a liquid discharge head that discharges a liquid from a nozzle provided on a nozzle surface, a storage support portion supporting the wiping member and configured to store the liquid by the wiping, and a movement support portion mounting the storage support portion and configured to reciprocate along a wiping direction, which is a direction in which the wiping is performed, and a cleaning portion cleaning the wiping member, in which the cleaning portion includes a cleaning member and a guide portion guiding the cleaning member. causing the cleaning member to follow a movement of the wiping portion in the wiping direction which is a direction in which the wiping is performed, and scrape off the liquid adhering to the wiping member while being guided by the guide portion.

With this configuration, the same effect as the wiping module is obtained.

What is claimed is:

1. A wiping module comprising:

a wiping portion including a wiping member wiping a liquid discharge head that discharges a liquid from a nozzle provided on a nozzle surface, a storage support portion supporting the wiping member and configured to store the liquid by the wiping, and a movement support portion mounting the storage support portion and configured to reciprocate along a wiping direction, which is a direction in which the wiping is performed; and a cleaning portion cleaning the wiping member, wherein the cleaning portion includes a cleaning member and a guide portion guiding the cleaning member, and the cleaning member is configured to follow a movement of the wiping portion in the wiping direction and to scrape off the liquid adhering to the wiping member while being guided by the guide portion, the cleaning member using a driving force of the wiping portion when following the movement of the wiping portion.

2. The wiping module according to claim 1, wherein when a direction in which the liquid discharge head discharges the liquid is defined as a discharge direction, the cleaning member moves in a direction opposite to the discharge direction while being guided by the guide portion, so that the liquid adhering to the wiping member is scraped off.

3. The wiping module according to claim 1, wherein the cleaning member is configured such that a tip end side in contact with the wiping member rises higher than a base end side as the wiping portion moves in the wiping direction.

4. The wiping module according to claim 3, wherein a flow path for flowing the liquid stored by cleaning to an outside of the cleaning member is provided on the base end side of the cleaning member.

5. The wiping module according to claim 1, wherein the guide portion includes a holding portion configured to temporarily hold the cleaning member at a position where the wiping member and the cleaning member do not come into contact with each other.

6. The wiping module according to claim 1, wherein the guide portion includes a cleaning path of the cleaning member when cleaning the wiping member, and a return path of the cleaning member after cleaning the wiping member, and the return path passes through a position higher than the cleaning path.

7. The wiping module according to claim 1, wherein the wiping member includes a nozzle surface wiping member wiping the nozzle surface, and a side surface wiping member wiping a side surface of the liquid discharge head that intersects the nozzle surface, and when wiping the liquid discharge head, the side surface wiping member is disposed behind the nozzle surface wiping member.

8. A discharge module comprising: a liquid discharge head discharging a liquid; and the wiping module according to claim 1.

9. A liquid discharge apparatus comprising:

a liquid discharge head discharging a liquid;

a wiping module comprising:

a wiping portion including a wiping member wiping a liquid discharge head that discharges a liquid from a nozzle provided on a nozzle surface, a storage support portion supporting the wiping member and configured to store the liquid by the wiping, and a movement support portion mounting the storage support portion and configured to reciprocate along a wiping direction, which is a direction in which the wiping is performed; and a cleaning portion cleaning the wiping member, wherein the cleaning portion includes a cleaning member and a guide portion guiding the cleaning member, and the cleaning member is configured to follow a movement of the wiping portion in the wiping direction and to scrape off the liquid adhering to the wiping member while being guided by the guide portion;

a coupling portion configured to be coupled to the storage support portion; and a decompression mechanism configured to reduce a pressure of the coupling portion.

10. The liquid discharge apparatus according to claim 9, wherein the storage support portion includes a storage portion storing the liquid, a discharge portion coming into contact with and separated from the coupling portion by a movement of the wiping portion, and a communication path communicating with the storage portion and the discharge portion, the discharge portion is provided at a position higher than a lowermost portion of the storage portion, and at least a part of the communication path extends in a direction opposite to the wiping direction.

11. The liquid discharge apparatus according to claim 9, further comprising:

a detecting portion that detects that the wiping portion is at a detection position between a position of the wiping portion when the cleaning member starts to clean the wiping member and a position of the wiping portion when the cleaning member is switched from a movement to the wiping direction to a movement to the direction opposite to the wiping direction.

12. The liquid discharge apparatus according to claim 9, wherein the liquid discharge head is configured to discharge the liquid to the medium while being inclined from a horizontal plane, and the wiping portion wipes the liquid discharge head in an inclined state.

13. A wiping module comprising:

a wiping portion including a wiping member wiping a liquid discharge head that discharges a liquid from a nozzle provided on a nozzle surface, a storage support portion supporting the wiping member and configured to store the liquid by the wiping, and a movement support portion mounting the storage support portion and configured to reciprocate along a wiping direction, which is a direction in which the wiping is performed; and a cleaning portion cleaning the wiping member, wherein the cleaning portion includes a cleaning member and a guide portion guiding the cleaning member, the cleaning member is configured to follow a movement of the wiping portion in the wiping direction and to scrape off the liquid adhering to the wiping member while being guided by the guide portion, the guide portion includes a cleaning path of the cleaning member when cleaning the wiping member, and a return path of the cleaning member after cleaning the wiping member, and the cleaning path and the return path are at least partially different.

14. The wiping module according to claim 13, wherein the return path passes through a position higher than the cleaning path.

15. A discharge module comprising: a liquid discharge head discharging a liquid; and the wiping module according to claim 13.

16. A liquid discharge apparatus comprising:

a liquid discharge head discharging a liquid;

the wiping module according to claim 13;

a coupling portion configured to be coupled to the storage support portion; and a decompression mechanism configured to reduce a pressure of the coupling portion.

* * * * *